(12) United States Patent
Zou et al.

(10) Patent No.: US 11,758,500 B2
(45) Date of Patent: Sep. 12, 2023

(54) METHODS FOR CONTROLLING UNAUTHORIZED AERIAL UES

(71) Applicant: Telefonaktiebolaget LM Ericsson (publ), Stockholm (SE)

(72) Inventors: Zhenhua Zou, Solna (SE); Mattias Bergström, Sollentuna (SE); Xingqin Lin, Santa Clara, CA (US); Helka-Liina Määttanen, Helsinki (FI); Henrik Rydén, Solna (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/970,092

(22) PCT Filed: Mar. 28, 2019

(86) PCT No.: PCT/IB2019/052573
§ 371 (c)(1),
(2) Date: Aug. 14, 2020

(87) PCT Pub. No.: WO2019/193469
PCT Pub. Date: Oct. 10, 2019

(65) Prior Publication Data
US 2021/0112515 A1    Apr. 15, 2021

Related U.S. Application Data

(60) Provisional application No. 62/653,243, filed on Apr. 5, 2018.

(51) Int. Cl.
*H04W 60/06*     (2009.01)
*H04W 76/32*     (2018.01)
(Continued)

(52) U.S. Cl.
CPC ............ *H04W 60/06* (2013.01); *G08G 5/006* (2013.01); *G08G 5/0013* (2013.01);
(Continued)

(58) Field of Classification Search
CPC .... G08G 5/006; G08G 5/0069; G08G 5/0013; H04W 4/021; H04W 60/06; H04W 12/63;
(Continued)

(56) References Cited

U.S. PATENT DOCUMENTS 9,866,313 B1    1/2018  Murphy
2011/0110308 A1*   5/2011  Liang ................... H04W 60/06
                                                        370/328
(Continued)

FOREIGN PATENT DOCUMENTS

AU    2016201674 B1    9/2016
CA       2731286 A1    8/2011
(Continued)

OTHER PUBLICATIONS

"3GPP TS 24.301 V15.5.0", 3rd Generation Partnership Project; Technical Specification Group Core Network and Terminals; Non-Access-Stratum (NAS) protocol for Evolved Packet System (EPS); Stage 3 (Release 15), Dec. 2018, pp. 1-536.
(Continued)

*Primary Examiner* — Margaret G Mastrodonato
(74) *Attorney, Agent, or Firm* — SAGE PATENT GROUP

(57) ABSTRACT

Exemplary embodiments include methods performed by a network node of a radio access network (RAN). Such embodiments can include establishing a connection with a user equipment (UE) in a cell served by the network node, and determining that the UE is engaged in unauthorized aerial operation. Unauthorized operation can include various UE operational conditions. Such embodiments can also include, based on determining the unauthorized aerial opera-
(Continued)

tion, performing at least one of the following operations: restricting the performance of the connection; and sending the UE a message comprising an indication that the connection will be released, and one or more conditions that the UE must meet before attempting to reestablish the connection. Embodiments also include complementary methods performed by one or more core network nodes and/or functions, as well as various network nodes and/or functions that are configured to perform various disclosed methods.

21 Claims, 12 Drawing Sheets

(51) Int. Cl.
- *H04W 12/37* (2021.01)
- *H04W 12/082* (2021.01)
- *G08G 5/00* (2006.01)
- *H04W 4/021* (2018.01)
- *H04W 60/02* (2009.01)
- *H04W 12/64* (2021.01)

(52) U.S. Cl.
CPC .......... *G08G 5/0069* (2013.01); *H04W 4/021* (2013.01); *H04W 12/082* (2021.01); *H04W 12/37* (2021.01); *H04W 60/02* (2013.01); *H04W 76/32* (2018.02); *H04W 12/64* (2021.01)

(58) Field of Classification Search
CPC ... H04W 48/02; H04W 76/32; H04W 84/042; H04W 12/082; H04W 12/37; H04W 60/02

See application file for complete search history.

(56) References Cited

U.S. PATENT DOCUMENTS

| | | | | |
|---|---|---|---|---|
| 2014/0003348 | A1* | 1/2014 | Velev | H04W 60/06 370/328 |
| 2014/0140270 | A1* | 5/2014 | Shaw | H04W 48/18 370/328 |
| 2015/0379874 | A1 | 12/2015 | Ubhi et al. | |
| 2016/0225264 | A1* | 8/2016 | Taveira | G08G 5/0013 |
| 2017/0201091 | A1 | 7/2017 | Shao et al. | |
| 2017/0295069 | A1 | 10/2017 | Sweet et al. | |
| 2018/0033244 | A1 | 2/2018 | Northrup et al. | |
| 2019/0212724 | A1* | 7/2019 | Phuyal | G05D 1/0022 |
| 2020/0077321 | A1* | 3/2020 | Shi | H04W 24/04 |
| 2020/0219408 | A1* | 7/2020 | Han | B64C 39/024 |

FOREIGN PATENT DOCUMENTS

| | | |
|---|---|---|
| CA | 2955737 A1 | 10/2017 |
| CN | 202773081 U | 3/2013 |
| CN | 104170344 A | 11/2014 |
| CN | 104809918 A | 7/2015 |
| CN | 105206116 A | 12/2015 |
| CN | 107331213 A | 11/2017 |
| CN | 107516437 A | 12/2017 |
| EP | 3158553 A1 | 4/2017 |

OTHER PUBLICATIONS

"3GPP TR 36.777 V15.0.0", 3rd Generation Partnership Project; Technical Specification Group Radio Access Network; Study on Enhanced LTE Support for Aerial Vehicles (Release 15), Dec. 2017, pp. 1-142.
"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.
"3GPP TS 36.306 V13.8.0", 3rd Generation Partnership Project; Technical Specification Group Radio Access Network; Evolved Universal Terrestrial Radio Access (E-UTRA); User Equipment (UE) radio access capabilities (Release 13), Dec. 2017, pp. 1-65.
"3GPP TS 36.331 V13.8.1", 3rd Generation Partnership Project; Technical Specification Group Radio Access Network; Evolved Universal Terrestrial Radio Access (E-UTRA); Radio Resource Control (RRC); Protocol specification (Release 13), Jan. 2018, pp. 1-637.
"3GPP TS 38.401 V15.4.0", 3rd Generation Partnership Project; Technical Specification Group Radio Access Network; NG-RAN; Architecture description (Release 15), Dec. 2018, pp. 1-40.
"New SID on Enhanced Support for Aerial Vehicles", 3GPP TSG RAN Meeting #75; RP-170779 (revision of RP-170742); Dubrovnik, Croatia, Mar. 6-9, 2017, pp. 1-4.
"New WID on Enhanced LTE Support for Aerial Vehicles", 3GPP TSG RAN Meeting #78; RP-172826; Lisbon, Portugal, Dec. 18-21, 2017, pp. 1-4.
"On flying UE without subscription", 3GPP TSG-RAN WG2 #101 bis; R2-1805627; Sanya, China, Apr. 16-20, 2018, pp. 1-2.
"Reply LS on Certification/License and Identification of Aerial Vehicles", 3GPP TSG RAN WG2 Meeting 101; R2-1804089; Athens, Greece, Feb. 26-Mar. 2, 2018, pp. 1-2.
"3GPP TR 38.801 V14.0.0"; 3rd Generation Partnership Project; Technical Specification Group Radio Access Network; Study on new radio access technology: Radio access architecture and interfaces (Release 14), Mar. 2017, pp. 1-91.
"3GPP TS 23.401 V15.3.0", 3rd Generation Partnership Project; Technical Specification Group Services and System Aspects; General Packet Radio Service (GPRS) enhancements for Evolved Universal Terrestrial Radio Access Network (E-UTRAN) access (Release 15), Mar. 2018, pp. 1-402.
"3GPP TS 23.501 V15.5.0"; 3rd Generation Partnership Project; Technical Specification Group Services and System Aspects; System Architecture for the 5G System; Stage 2 (Release 15), Mar. 2019, pp. 1-241.
First Office Action for Chinese Patent Application No. CN 201980021831.8 dated Apr. 2, 2022, 13 pages.
Second Chinese Office Action for Chinese Patent Application No. CN 201980021831.8 dated Oct. 9, 2022, 7 pages (including English translation).
Notification to Grant Patent Right, Chinese Application No. 201980021831.8 dated Dec. 26, 2022, 6 pages.

* cited by examiner

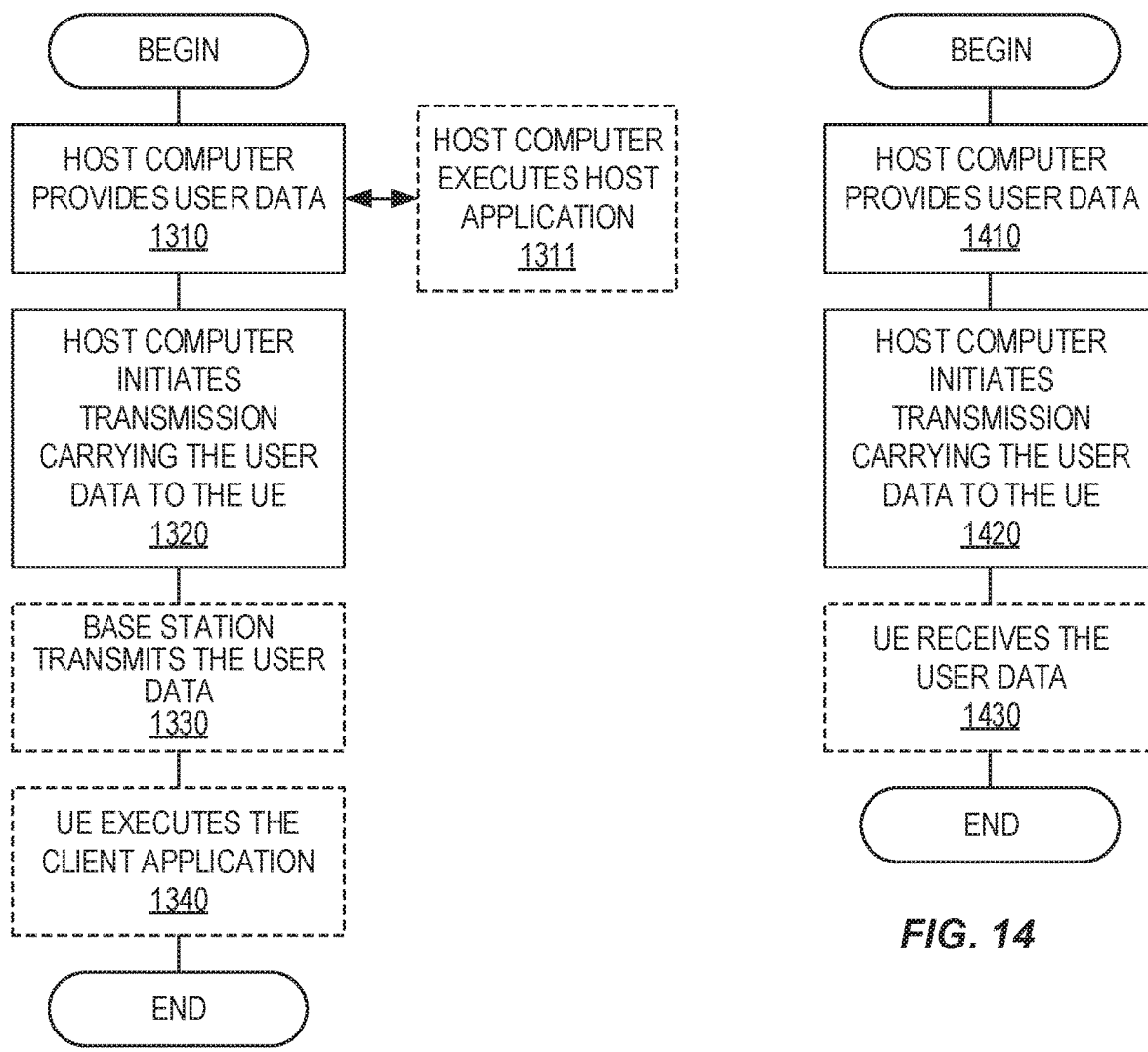

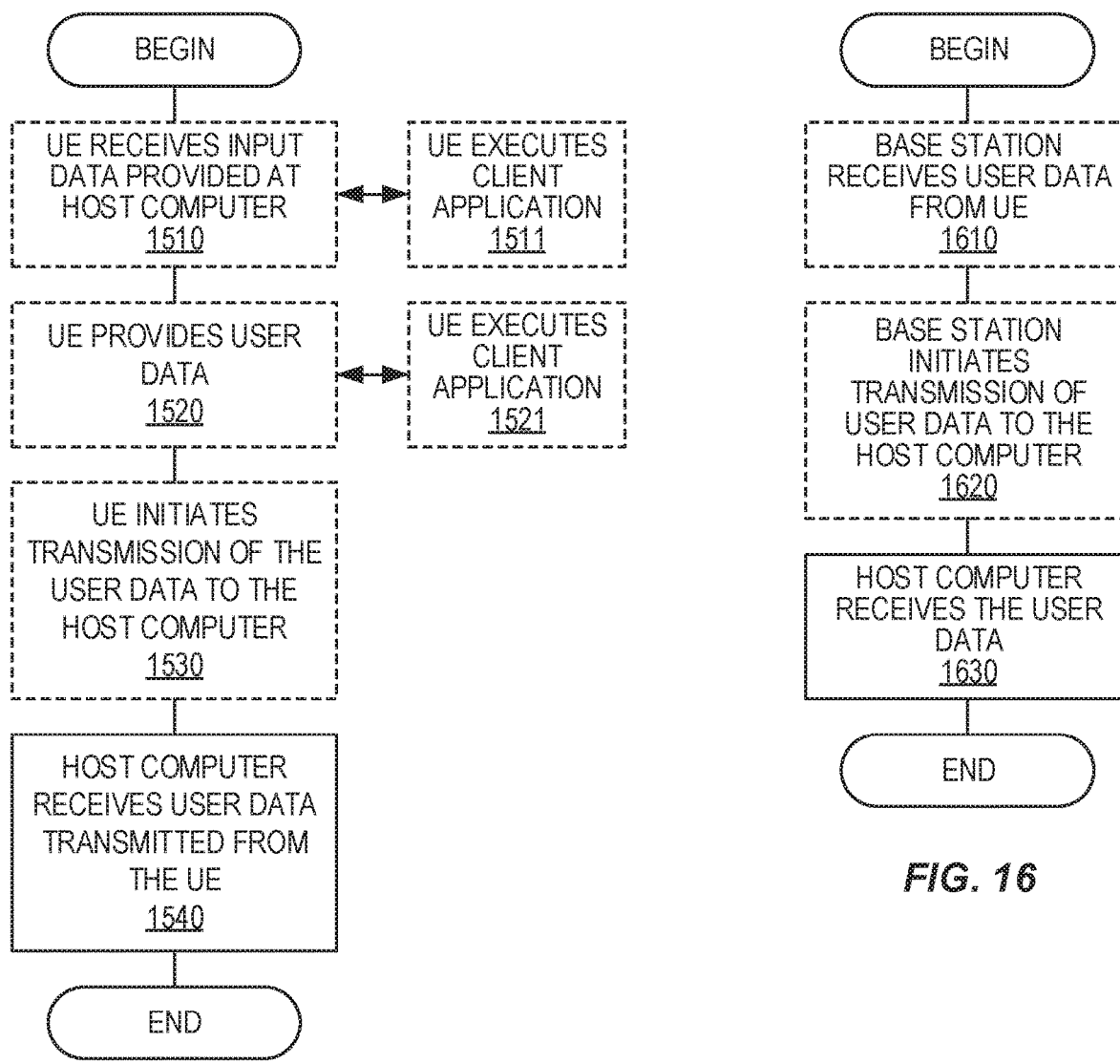

ial UEs

METHODS FOR CONTROLLING UNAUTHORIZED AERIAL UES

TECHNICAL FIELD

The present application relates generally to the field of telecommunications and more specifically to techniques that facilitate management and control of airborne (or aerial) user equipment (UEs, e.g., drones) that are flying in some unauthorized manner.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In 3GPP, a study item on a new radio interface for a fifth-generation (5G) cellular (e.g., wireless) network has recently been completed. 3GPP is now standardizing this new radio interface, often abbreviated by NR (New Radio). FIG. 2 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 250. With respect the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 2 (and described in TS 38.401 and TR 38.801) include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 3. The gNB-CU and connected gNB-DUs are only visible to other gNBs and the 5GC as a gNB. In other words, the F1 interface is not visible beyond gNB-CU.

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBs 310 (e.g., 310*a,b*) and ng-eNBs 320 (e.g., 320*a,b*) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330*a,b*) via respective NG-C interfaces and to the UPF (User Plane Function) 340 (e.g., UPFs 340*a,b*) via respective NG-U interfaces.

Each of the gNBs 310 can support the NR radio interface, including frequency division duplexing (FDD), time division duplexing (TDD), or a combination thereof. In contrast, each of ng-eNBs 320 supports the LTE radio interface but, unlike conventional LTE eNBs (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This SBA model, which further adopts principles like modularity, reusability and self-containment of NFs, can enable deployments to take advantage of the latest virtualization and software technologies.

In general, a NF service is a type of capability exposed by one NF (Service Producer) to other authorized NFs (Service Consumers) through a service-based interface (SBI). A NF service may support one or more NF service operation(s). Access to these various services can be provided, for example, by Hyper Text Transfer Protocol/Representational State Transfer (HTTP/REST) application programming interfaces (APIs). In general, the various services are self-contained functionalities that can be changed and modified in an isolated manner without affecting other services. Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify".

FIG. 4 shows an exemplary non-roaming 5G reference architecture with service-based interfaces and various 3GPP-defined NFs within the Control Plane (CP), including:

Access and Mobility Management Function (AMF) with Namf interface;

Session Management Function (SMF) with Nsmf interface;

User Plane Function (UPF) with Nupf interface;

Policy Control Function (PCF) with Npcf interface;

Network Exposure Function (NEF) with Nnef interface;

Network Repository Function (NRF) with Nnrf interface;

Network Slice Selection Function (NSSF) with Nnssf interface;

Authentication Server Function (AUSF) with Nausf interface;

Application Function (AF) with Naf interface; and

Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The services in 5GC will likely be built in a stateless way, such that the business logic and data context will be separated. This means that the services store their context externally in a proprietary database. This can facilitate various cloud infrastructure features like auto-scaling or auto-healing. The NRF allows every NF to discover the services offered by other NFs, and Data Storage Functions (DSF) allow every NF to store its context. In addition, the NEF provides exposure of capabilities and events of the 5GC to application functions (AFs) within the 5GC and outside of the 5GC. For example, NEF provides a service that allows an AF to provision specific subscription data (e.g., expected UE behavior) for various UEs.

3GPP specifications include serving aerial vehicles using LTE network deployments with base station antennas targeting terrestrial coverage. Particular specifications are related to interference caused by drones (i.e., unmanned aerial vehicles or UAVs for short) using the LTE network and performing handover between cells in the network. An objective of particular LTE specifications is to provide connectivity and positioning services to drones. It is anticipated that similar requirements and/or capabilities will be beneficial and/or necessary in 5G/NR networks.

An LTE- or NR-capable UAV (referred to as an "airborne UE" or "aerial UE") may experience radio propagation conditions that are different than those experienced by a conventional UE on or close to the ground. When an aerial UE is flying at a low altitude relative to a base station antenna height, the aerial UE behaves like a conventional UE. When the aerial UE is flying well above the base station antenna height, however, the uplink signal from the aerial UE can be received by multiple (e.g., many) cells since the lack of obstructions at this height creates highly favourable (e.g., line-of-sight) propagation conditions.

As such, the uplink signal from the aerial UE can increase interference in neighbor cells. Increased interference negatively impacts a conventional UE (e.g., smartphone, Internet-of-Things (IoT) device, etc.) on or near the ground. Thus, the network may need to limit the admission of aerial UE in the network to restrict the impact to the performance of the conventional UEs. Furthermore, because the base station antenna beam patterns are typically downtilted (e.g., negative elevation angle) to serve UEs on the ground or at least below the antenna height, conventional UEs typically receive from/transmit to the antenna pattern's main lobe. However, aerial UEs flying above significantly above antenna height are likely served by the antenna pattern's side lobes.

In 3GPP TR 36.777 of the study item (SI) on enhanced support for aerial vehicles, it was proposed for the UE to send a radio capability indicator that identifies the UE as having capabilities needed to support the UAV related functions in LTE network. Similarly, permission (e.g., allowed/not allowed) for a UE to function as an aerial UE in the 3GPP network can be known from subscription information which is passed to RAN via S1 signalling from the MME. The eNB may use this information together with UE radio capability indicator to identify an aerial UE and to perform the necessary control using the relevant feature(s).

Even so, an aerial UE's flying status can change quickly, and only an eNB can obtain the UE's flying status based on signalling or measurements between UE and eNB. Furthermore, there are currently no mechanisms defined for an eNB to properly control an aerial UE flying in an authorized manner (e.g., without subscription), including preventing such aerial UEs from wasting network resources from repeated connection attempts.

SUMMARY

Accordingly, exemplary embodiments of the present disclosure address these and other difficulties in controlling aerial UEs engaged in unauthorized aerial operation.

Exemplary embodiments of the present disclosure include methods and/or procedures performed by a network node of a radio access network (RAN). The exemplary method and/or procedure can include establishing a connection with a user equipment (UE) in a cell served by the network node. In various embodiments, the connection can include a signalling connection (e.g., RRC). In some embodiments, the connection can also include a data (e.g., user-plane) connection (e.g., data radio bearers (DRBs). The exemplary methods and/or procedures can also include determine that the UE is engaged in unauthorized aerial operation. This can include detecting that the UE is engaged in aerial operation, as well as determining that the UE's aerial operation is unauthorized in some manner. For example, the network node can determine that the UE does not have a subscription that permits aerial operation, that the UE is operating at an altitude higher than permitted according to the UE's subscription, and/or that the UE is operating in a restricted area that is not permitted according to the UE's subscription.

The exemplary method and/or procedure can also include perform at least one operation based on determining the unauthorized aerial operation. The at least one operation can include restricting the performance of the connection. Also, the at least one operation can include sending the UE a message including an indication that the connection will be released, and one or more conditions that the UE must meet before attempting to reestablish the connection. In some embodiments, the one or more conditions can include any of the following: a minimum time duration that the UE must wait; a maximum altitude that the UE must descend below; and an area that the UE must enter or exit from. In some embodiments, the at least one operation can include one or more operations with a core network (CN), such as in relation to a detach procedure.

Other exemplary embodiments of the present disclosure include other methods and/or procedures one or more nodes of a core network (CN) that is connected to a radio access network (RAN). The exemplary method and/or procedure can include establishing a connection with a user equipment (UE) via the RAN. In various embodiments, the connection can include a signalling (e.g., control-plane) connection. In some embodiments, the connection can also include a data (e.g., user-plane) connection, which can include one or more data bearers and/or be associated with a data session between the UE and the CN.

The exemplary method and/or procedure can also include determining that the UE is engaged in unauthorized aerial operation. This can include receiving an indication (e.g., from the RAN) the UE is engaged in aerial operation, as well as determining that the UE's aerial operation is unauthorized in some manner. For example, the CN can determine that the UE does not have a subscription that permits aerial operation, that the UE is operating at an altitude higher than permitted according to the UE's subscription, and/or that the UE is operating in a restricted area that is not permitted according to the UE's subscription.

The exemplary method and/or procedure can also include, based on determining that the UE is engaged in unauthorized aerial operation, performing a detach procedure towards the UE via the RAN. This can involve various operations, as explained in more detail below. In some embodiments, the detach procedure can include sending a detach request message to the UE via the RAN, and receiving a detach accept message from the UE via the RAN. In various embodiments, the detach request message can include any of the following information: a time duration until the UE will be detached from the CN; a detach cause indicating that the UE will be detached due to unauthorized aerial operation of the UE; an indication that the UE should not re-attach to the CN; an indication that the UE should re-attach to the CN via a different RAN having reduced capabilities compared to the RAN; and an indication that the UE is required to perform a tracking area update (TAU).

Other exemplary embodiments include network nodes (e.g., eNB, gNB, en-gNB, ng-eNB, MME, SGSN, HSS) and/or network functions (e.g., AMF, SMF, AUSF, UDM) configured to perform operations corresponding to any of the exemplary methods and/or procedures. Other exemplary embodiments include non-transitory, computer-readable media storing computer-executable instructions that, when executed by a processing circuit, configure a network node and/or network function to perform operations corresponding to any of the exemplary methods and/or procedures.

BRIEF DESCRIPTION OF THE DRAWINGS

FIGS. 13-16 are flow diagrams of exemplary methods and/or procedures for transmission and/or reception of user data that can be implemented, for example, in the exemplary communication systems and/or networks illustrated in FIGS. 11-12.

DETAILED DESCRIPTION

Figure 1:
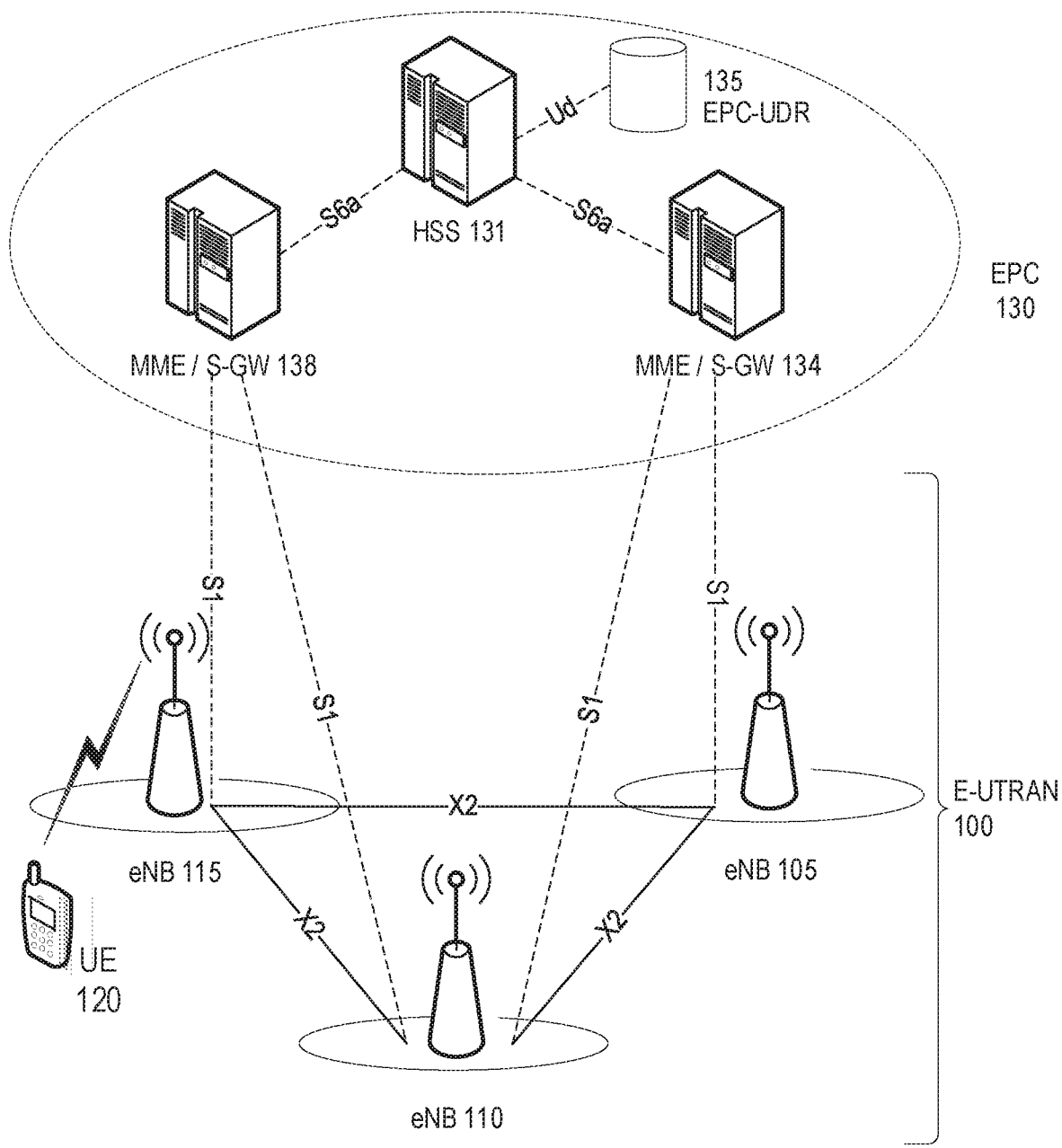
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
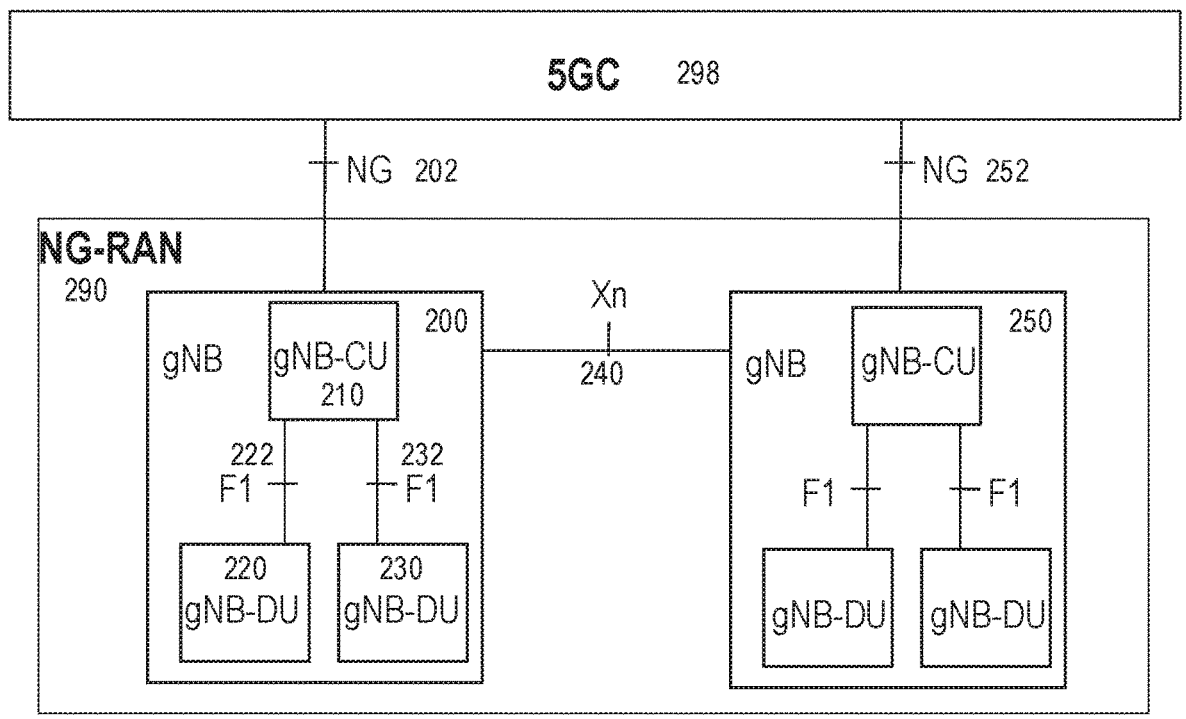
FIGS. 2-3 illustrate two different high-level views of a 5G network architecture.
Figure 3:
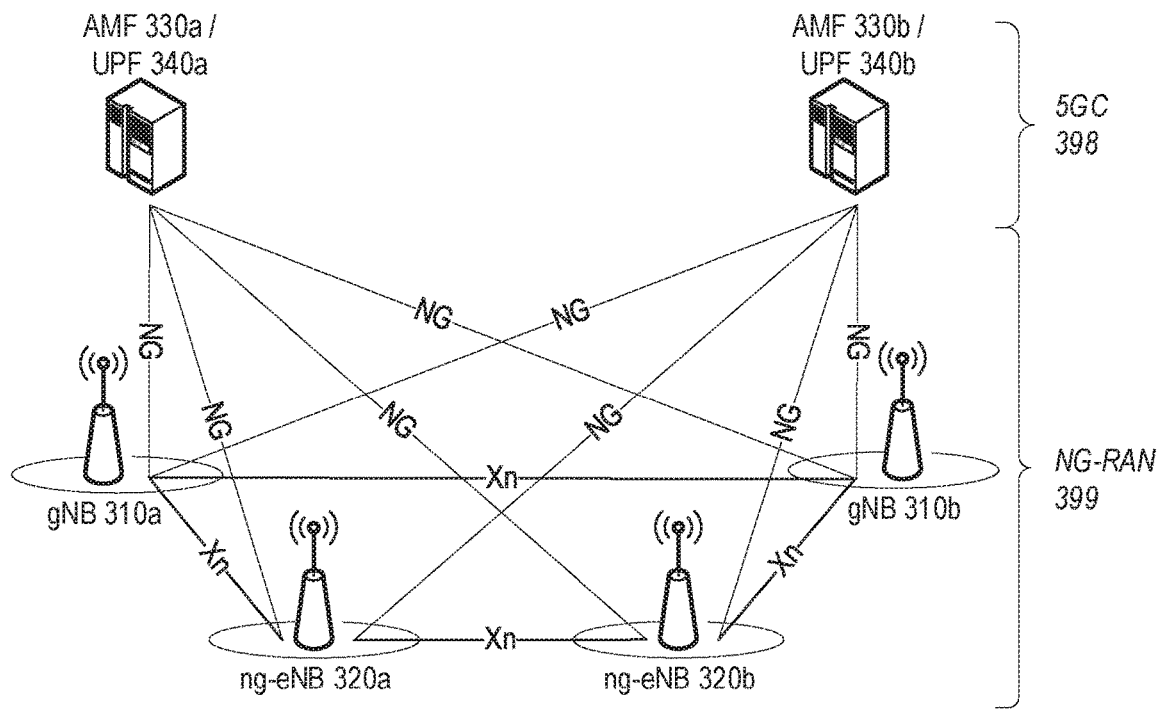

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

As briefly mentioned above, an aerial UE's flying status can change quickly, and only an eNB can obtain the UE's flying status based on signalling or measurements between UE and eNB. Furthermore, there are currently no mechanisms defined for an eNB to properly control an aerial UE flying without subscription, including preventing such aerial UEs from wasting network resources from repeated connection attempts. These aspects are discussed in more detail below.

3GPP TR 36.777 of the study item (SI) on enhanced support for aerial vehicles included the following conclusions:

E can indicate a radio capability to the network which may be used to identify a UE with the relevant functions to support the UAV related functions in LTE network. Permission for a UE to function as an Aerial UE in the 3GPP network can be known from subscription information which is passed to RAN via S1 signalling from the MME. The actual "aerial usage" certification/license/limitation of a UE and how it is reflected in the subscription information is outside of RAN2 scope, and may be provided from (non)-3GPP node(s) to a 3GPP node.

UE which is flying may be identified from the UE-based reporting, e.g., in-flight mode indication, altitude or location information, by utilizing enhanced measurement reporting mechanism (e.g., introduction of new events) or by the mobility history information available in the network.

Based on the technical report, a work item (WI) on enhanced support for aerial vehicles was approved in RAN #78, as explained in 3GPP Tdoc RP-172826, "New WID on Enhanced LTE Support for Aerial Vehicles." The subscription-based identification (including S1/X2 signaling) is one of the areas that will be specified before June 2018.

In RAN2 #101, the discussion on subscription-based identification started. Moreover, a liaison statement (e.g., R2-1804089) will be sent from RAN2 to other working groups to kick-off the work. In this work, SA2 will define subscription level information that a user is allowed to utilize feature(s) defined for aerial vehicles. Similarly, RAN3 and SA2 will specify the signaling to indicate the subscription information from MME to eNB during connection setup procedure and from source eNB to target eNB during the mobility procedures.

As discussed in R2-1804089, this subscription-based information indicates that the user is allowed to use the feature(s) defined for aerial vehicles. The eNB can use this one-bit (e.g., allowed/not allowed) piece of information about a UE's subscription together with UE radio capability to identify an aerial UE and to perform some degree of control using the relevant feature(s).

Even so, there are currently no mechanisms defined for an eNB to properly control an aerial UE flying without subscription or in various other ways that are unauthorized, such as at a height or in an area that is not permitted based on the subscription. One approach facilitated by the current 3GPP specifications is for the eNB to release the UE's Radio Resource Control (RRC). The problem with this approach is that eNB cannot prevent the UE from immediately reconnecting again via a random access procedure. Since the UE is still unauthorized, these reconnection attempts waste scarce network resources.

Figure 5:
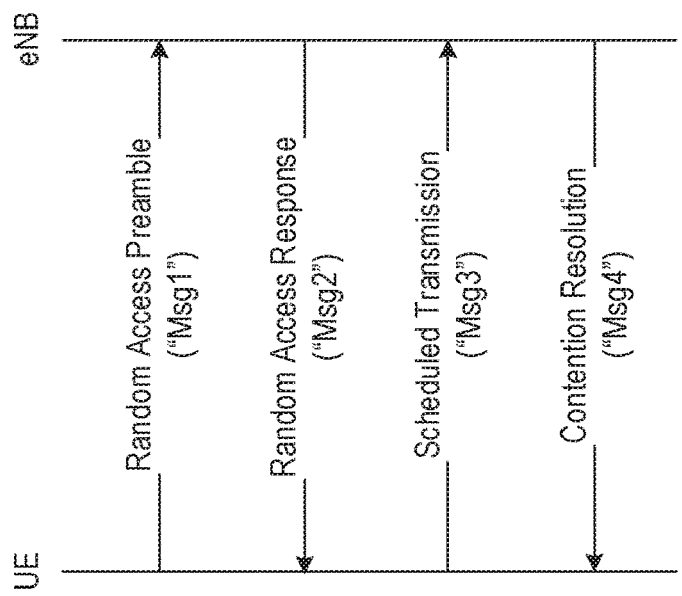
FIG. 5 shows an exemplary signalling flow for a contention-based random-access (CBRA) procedure between a UE (e.g., an aerial UE) and an eNB.
Figure 4:
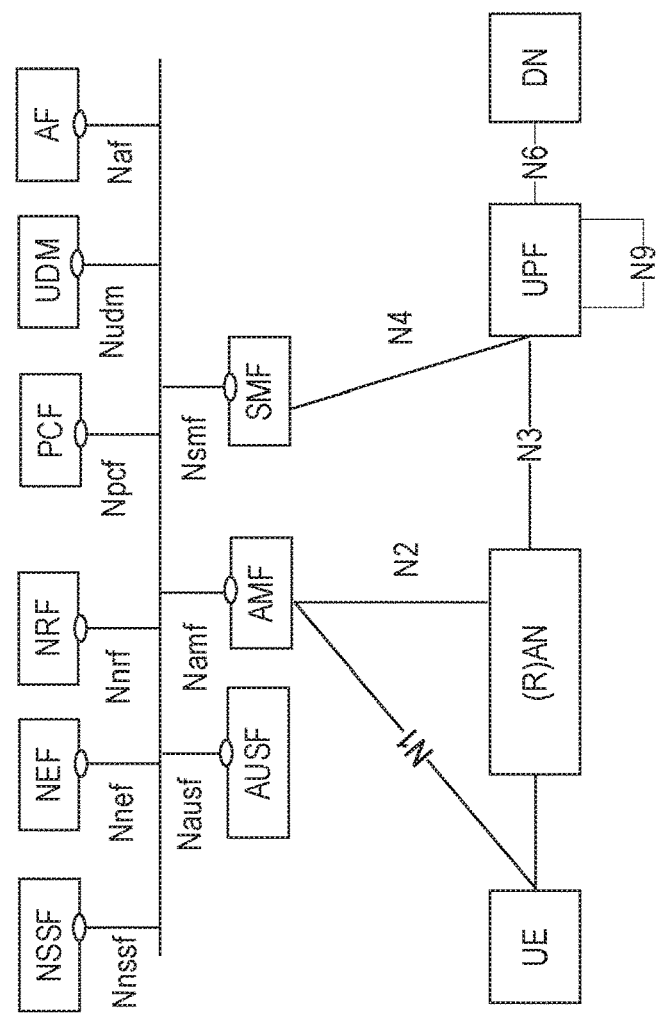
FIG. 4 shows an exemplary non-roaming 5G reference architectures with service-based interfaces and various network functions (NFs), as further described in 3GPP TS 23.501.

FIG. 5 shows an exemplary signalling flow for a contention-based random-access (CBRA) procedure between a UE (e.g., an aerial UE) and an eNB. In general, the UE can perform a RA procedure during various situations, including: initial access from RRC_IDLE; RRC connection re-establishment; handover; and UL or DL data arrival in RRC_CONNECTED mode when the UE is unsynchronized with the serving eNB. In the context of the present discussion, the procedure during connection re-establishment is of particular interest.

In the CBRA procedure, the UE initially selects one of the RA preambles available in the serving cell and transmits it to the eNB. This transmission is referred to as "Msg1." The UE does not include any identify information in Msg1. If the eNB receives the preamble correctly (due to, e.g., no collisions with other UEs transmitting the same preamble), it sends a medium access control (MAC) random access response (RAR) to the UE. Typically the RAR includes a timing advance (TA) command for alignment of subsequent UE transmissions, as well as a grant of UL resources for subsequent UE transmission ("UL grant") and a temporary identifier assigned to the UE in the cell ("C-RNTI"). The RAR is also referred to as "Msg2."

As shown in FIG. 5, if the UE correctly receives the RAR, it responds with the transmission scheduled by the UL grant in the RAR, and includes the C-RNTI assigned by the RAR. This transmission is also referred to as a *RRCConnectionRequest* message or "Msg3." If the eNB correctly receives Msg3, it responds with a contention resolution message ("Msg4").

In this procedure, the earliest point in time when eNB can know UE's identity is in the RRCConnectionRequest message (i.e., "Msg3"). After that, the eNB can reject the RRC connection request based on the UE identity, but the UE can still try to connect, up to a maximum number of times set by the RRC configuration parameter preambleTransMax. There are several drawbacks of this approach, including the following:

Resources are wasted during the repetitive initial access, i.e., resources are unnecessarily used for transmitting Message 1 to Message 4 in vain.

The eNB needs to keep track of whether a UE with one particular S-TMSI has been identified as flying without subscription. Most likely, the eNB keeps a timer after the expiry of which it accepts an RRC connection request from the same UE. This means more resource utilizations at eNB.

This approach does not prevent the UE from connecting to another cell associated with another eNB (either independently or after reaching a maximum preambleTransMax of attempts with a first eNB). Since a flying UE can see many different cells, this will likely continue for a very long time. It further increases utilization on random-access resources.

Another approach to prevent an unauthorized UE from excessively attempting repeated random accesses to the network is to set a large back off parameter in the RAR (i.e., "Msg2"). As stated above, however, the UE identity is only known at Msg3, so this approach would require setting large backoffs for all UEs, causing unnecessarily long RA delays to the large majority of UEs—both conventional and aerial—that are operating in an authorized manner.

Exemplary embodiments of the present disclosure address these and other problems, challenges, and/or issues by providing managing and/or controlling UEs engaged in unauthorized aerial operation. In general, when the network determines that a UE, connected in a cell of the network, is engaged in unauthorized aerial operation, the network can perform one or more actions to prevent the unauthorized UE from interfering with network operations and/or reducing network performance. For example, the network can restrict the performance of and/or limit the resources allocated to the unauthorized UE's connection in various ways. As another example, the network can send the UE a message indicating that the UE's connection will be released, along with one or more conditions that the UE must meet before attempting connection re-establishment. As yet another example, the network can perform one or more operations toward a core network (CN).

In this manner, such techniques can facilitate an improved and/or more optimal management and/or control of UEs engaged in unauthorized aerial operation. By use of these techniques, a network can reduce the resources allocated to unauthorized aerial UEs and utilize the freed-up resources for authorized UEs (e.g., conventional and/or aerial), thereby improving performance as perceived by these authorized UEs. Additionally, by placing conditions on connection re-establishment via CBRA procedure, these techniques reduce contention between authorized and unauthorized UEs, thereby improving the RA delays experienced by authorized UEs. Such reduced delays can result in improvements to UE mobility operations involving RA procedures, such as handover. Furthermore, by controlling unauthorized UE access in this manner, such techniques can discourage unauthorized use of aerial UEs, such as at excess heights, in restricted areas, etc.

In various embodiments, a network node (e.g., eNB or gNB) of a radio access network (RAN, e.g., E-UTRAN, NG-RAN) can establish a connection with a UE in a cell served by the network node. The established connection can include a network signalling (or "control plane") connection, such as a radio resource control (RRC) connection. In some cases, the established connection can also include, or be associated with, a user data (or "user plane") connection. Such a user-plane connection can include one or more data radio bearers (DRBs) between the UE and the network node, as well as a data session between the UE and a core network (CN, e.g., EPC, 5GC) via the network node. Subsequently, the network node can perform the following operations with respect to the UE:

Detecting that the UE is engaged in aerial operation; and
Detecting that the UE's aerial operation is unauthorized in some manner.

Based on the positive result of both of these operations (referred to as "determining unauthorized aerial operation"), the network node can perform various operations toward the UE and/or toward the CN. These various embodiments are described in more detail below.

In some embodiments, the network node can send the UE a message (e.g., an RRCConnectionRelease message) indicating that the UE's connection (e.g., RRC connection) will be released. The network node can release the UE's connection any time after sending this message, including immediately (e.g., without any substantial delay). The message can also indicate to the UE that it must back-off for a particular time before trying to re-connect (e.g., via CBRA procedure shown in FIG. 5).

In some embodiments, the UE backoff can be indicated by identifying an appropriate timer in the message to the UE. When the UE receives such a message, it waits for the specified time before reconnecting. For instance, an existing timer like extendedWaitTime can be used in RRCConnectionRelease or RRCConnectionReject messages. Currently, extendedWaitTime is only valid for "delay tolerant access" but the specification and/or definition can be expanded to apply to UEs that support an "Aerial UE access request." Alternately, a new timer can be defined specifically for UEs that support an "Aerial UE access request." For example, such a timer could be designated extended WaitTimeAerial. This new timer can be indicated in the message sent to the UE in the same manner as existing timers, described above.

In other embodiments, so-called aerial UEs can be required, by 3GPP specification, to support the existing "delay tolerant access" feature. For example, 3GPP TS 36.306 can be modified to specify that it is mandatory for a UE supporting Rel-15 "aerial UE" features to also support "delay tolerant access," as currently specified in 3GPP TS 36.331. The exact wording in the specification would depend on how Aerial UE capabilities are going to be captured.

In some embodiments, in the message releasing the UE's RRC connection, the network node can include a release cause indicating that the connection release is related to unauthorized aerial operation. In some embodiments, there can be multiple specific release causes related to various types of unauthorized aerial operation. For example, when the network node determines that the UE does not have a subscription that permits aerial operation, the network node can include a release cause of flyingWithoutSubscription. As another example, when the network node detects that the UE is operating at an altitude higher than permitted according to the UE's subscription, the network node can include a release cause of flyingAtUnauthorizedAltitude. As another example, detecting that the UE is operating in a restricted area that is not permitted according to the UE's subscription, the network node can include a release cause of flyingIn- RestrictedArea. The following shows an exemplary ASN.1 data structure for a Release Cause information element (IE) according to these examples.

```
ReleaseCause ::= ENUMERATED    {loadBalancingTAUrequired, other,
                                cs-FallbackHighPriority-v1020,
                                rrc-Suspend-v1320, flyingWithoutSubscription,
                                flyingAtUnauthorizedAltitude,
                                flyingInRestrictedArea }
```

When an aerial UE receives a connection release message with these exemplary Release Cause values, it can perform according to the following rules and/or configurations:

flyingWithoutSubscription: the UE waits a configured time (e.g., specified by extended WaitTimeAerial) before attempting to reconnect.

flyingAtUnauthorizedAltitude: the UE does not attempt to reconnect until the altitude is lower than a limit and/or threshold that has been predefined (e.g., via local laws, such as U.S. FCC) or otherwise configured (e.g., via other RRC messages).

flyingInRestrictedArea: the UE does not attempt to reconnect until it has moved away from the restricted area. For example, the "restricted area" can be defined as the cell that released the connection, such that the UE only attempts to reconnect when it moves to a different cell. Alternately, restricted areas can be predefined (e.g., via local laws) or otherwise configured (e.g., via other RRC messages) in a manner similar to unauthorized altitudes.

In some embodiments, the network node can determine that the UE is engaged in unauthorized aerial operation based on signalling with the CN. For example, after detecting that the UE is engaged in aerial operation, the network node can send the CN a request for the UE's subscription information. Based on receiving the subscription information from the CN, the network node can determine that the UE's aerial operation is unauthorized in some manner (e.g., flyingWithoutSubscription, flyingAtUnauthorizedAltitude, flyingInRestrictedArea).

In some embodiments, the network node can send a message (e.g., RRCConnectionRelease) to the unauthorized UE indicating that the connection will be released, along with a time duration until the connection will be released. In some embodiments, a Release Cause as described above can also be included. In response to receiving such a message, the unauthorized aerial UE can attempt to remedy the unauthorized aerial operation in the time duration before the connection is lost, such as by moving to a non-restricted location, dropping to an authorized altitude, etc. The aerial UE can also select the remedy based on the Release Cause, if included.

In some embodiments, the message sent to the unauthorized aerial UE by the network noce can be an RRCConnectionReject message. For example, the network node can send an RRCConnectionReject message if it determines that the UE is engaged in unauthorized aerial operation during RRC connection establishment. For example, the network node can send the RRCConnectionReject message in response to an RRCConnectionRequest from the UE.

As mentioned above, in various embodiments, the network node can perform various operations toward the CN based on determining that the UE is engaged in unauthorized aerial operation. The CN can also perform various operations in response. These are described in more detail below.

One advantage of these CN-related embodiments is that most features are applicable to aerial UEs that do not support drone-related features standardized by 3GPP (e.g., in LTE/NR rel-15 and later). In other words, such embodiments can facilitate management and/or control of legacy UEs engaged in aerial operation.

In some embodiments, the network node can send the CN an indication of the UE's unauthorized aerial operation. In some embodiments, there can be multiple specific indications related to various types of unauthorized aerial operation, such as for the Release Cause described above. In response, the CN can start a network-initiated detach procedure as specified in 3GPP TS 23.401. In various embodiments, the detach procedure can be initiated, performed, and/or facilitated by various CN nodes. For example, in the context of an LTE EPC, these nodes can include MME, SGSN, and/or HSS. Likewise, in the context of a 5GC, these nodes can include AMF, AUSF, UDM, and/or SMF.

Some exemplary operations of the CN-initiated detach procedure include:

The CN can send a Detach Request message to the UE, indicating that the detach will happen after a time duration, thereby giving the aerial UE some time to remedy the unauthorized operation. The Detach Request message can include a "detach cause" in a manner similar to the ReleaseCause described above.

In the Detach Request message, the CN can also include an indication that the UE should not re-attach to the CN. For example, this indication can be a "detach type" IE indicating "re-attach not required." Alternately, the CN can include a timer indication, whereby the UE is allowed to re-attach after the timer expires.

In the Detach Request message, the CN can also include an indication that the UE should re-attach to the CN via a different RAN having reduced capabilities compared to the RAN currently serving the UE. For example, the CN can indicate that the UE can re-attach via a GSM RAN providing significantly lower data rates than the currently-serving E-UTRAN.

In the Detach Request message, the CN can also include an indication that the UE is required to perform a tracking area update (TAU), such as for network load balancing. When the unauthorized aerial UE performs the requested TAU, the CN can reject the TAU, thereby effectively controlling access of the aerial UE to the network.

In cases involving law enforcement or a restricted flying area, the aerial UE's network subscription can be withdrawn with an HSS-initiated detach procedure.

As part of the detach procedure, the CN can release, delete, and/or terminate any data sessions and/or data bearers between the CN and the UE.

The network node serving the UE in the RAN can perform various operations associated with the CN-initiated detach procedure. For example, the network node can forward the Detach Request message from the CN to the UE, and forward a corresponding Detach Accept message from the UE to the CN. In addition, as part of the detach procedure, the CN can send the network node a command to release a RAN context associated with the UE. For example, the context can include information related to signalling (e.g., control plane) and/or data (e.g., user plane) connections between the CN and the UE via the RAN.

In other embodiments, rather than releasing the unauthorized UE's connection, the network node can restrict the performance of the connection. For example, the network node can refrain from allocating any cell resources for one or more data radio bearers (DRBs) associated with the connection. Alternately, the network node can schedule the unauthorized UE with only enough cell resources to support limited services, e.g., for a signalling connection.

As another example, the network node can reduce transmission rates for one or more DRBs associated with the connection. More specifically, the network node can use bandwidth throttling to limit the UE's uplink and downlink rates on applications such as video streaming, while maintaining the connection rates on applications such as command and control to facilitate safe operation of the aerial UE. As yet another example, the network node can reduce the priority of the UE, for access to cell resources, to less than the respective priorities of other UEs in the cell. More specifically, the network node can schedule the unauthorized UE when no other (authorized) UEs are transmitting and/or receiving data in the cell.

In various other embodiments, access class barring information broadcast by the network node can be used to control the access of aerial UEs. Specifically, before an aerial UE sends a connection request, the aerial UE can compare the received broadcast information to its application and/or capability to determine whether the connection should be barred. If so, the UE does not send the connection request. The broadcast access-class barring information can be arranged in various ways to bar various types of aerial UEs, as explained below.

In some of these embodiments, the barring can be based on UE capability. For example, a UE that does not have "aerial UE" (or "drone") capability can be barred from accessing the network based on the broadcast information, while UEs that have "aerial UE" (or "drone") capability can access the network without limitation.

In some of these embodiments, the barring can based on UE subscription. For example, a UE that does not have "aerial UE" (or "drone") subscription can be barred from accessing the network based on the broadcast information, while UEs that have "aerial UE" (or "drone") subscription can access the network without limitation.

In some of these embodiments, the barring can be based on application categories. For example, a UE that requires services that are unrelated to drone command and control can be barred from accessing the network based on the broadcast information, while UEs that only require drone command and control services can access the network without limitation.

In some of these embodiments, the barring can be based on UE mission. For example, mission non-critical aerial UEs can be barred from accessing the network based on the broadcast information, while mission-critical aerial UEs can access the network without limitation. Mission-criticality can be specified and/or determined in various ways.

The various embodiments described herein have been discussed in terms of UEs, network nodes operating in a RAN, and a CN. These aspects will be described in more detail below, keeping in mind that the UEs or wireless devices in the following diagrams would correspond to a UE residing on or comprising part of an aerial UE (e.g., drone or unmanned aerial vehicle, UAV). Aerial-UE-specific hardware is not described in detail, so as not to obscure discussion of the exemplary embodiments. Unless specifically stated to the contrary, any UE-based operations of the exemplary embodiments can be performed by any UE associated with an aerial vehicle, such as a drone.

Figure 6:
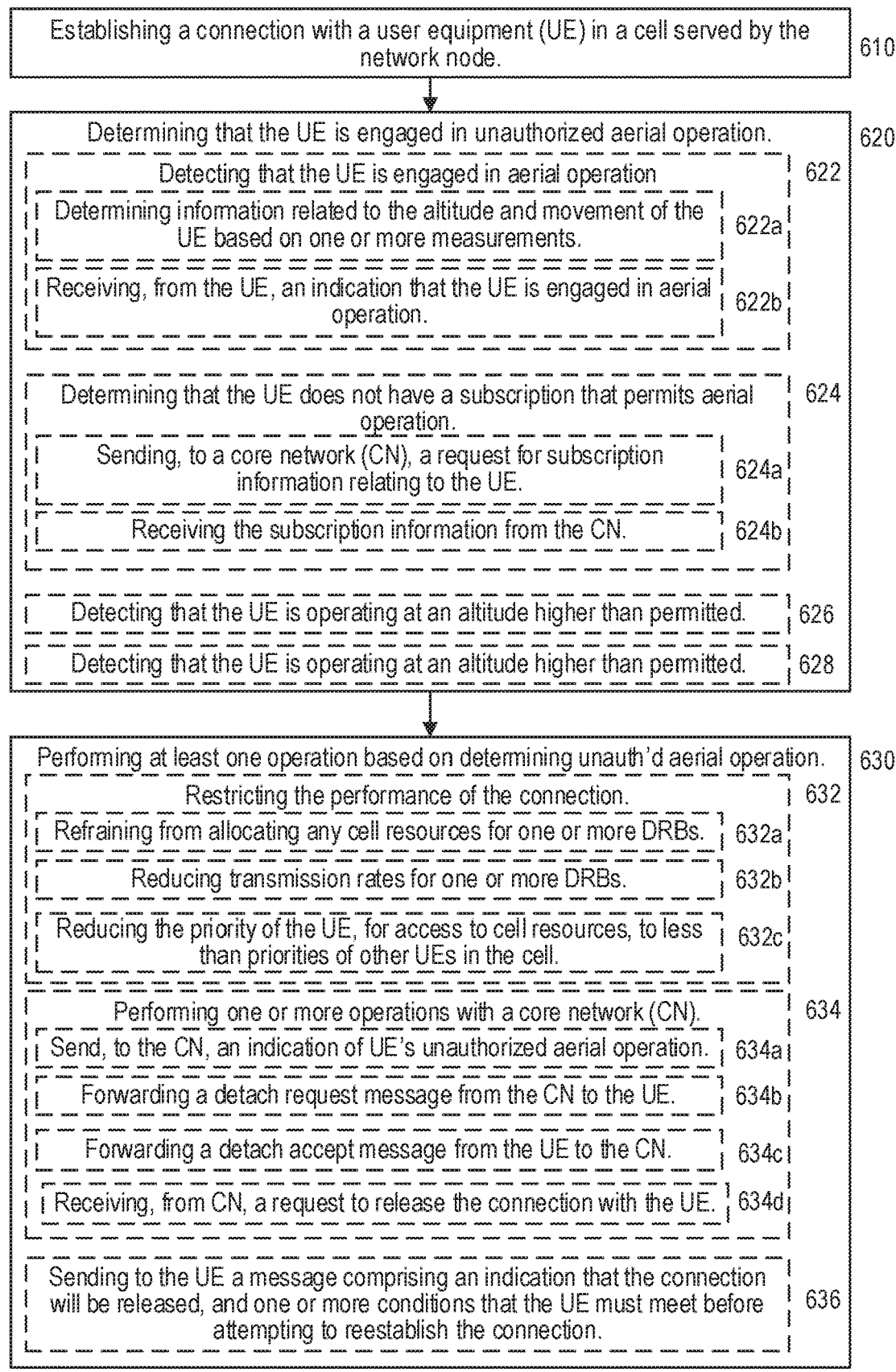
FIG. 6 illustrates exemplary methods and/or procedures performed by a network node of a radio access network (RAN), according to various exemplary embodiments of the present disclosure.

FIG. 6 illustrates an exemplary method and/or procedure performed by a network node of a radio access network (RAN), according to various exemplary embodiments of the present disclosure. The exemplary method and/or procedure shown in FIG. 6 can be performed by a radio node (e.g., eNB, gNB, en-gNB, ng-eNB, etc.) serving a cell in the RAN, such as described herein with respect to other figures. Although the exemplary method and/or procedure is illustrated in FIG. 6 by blocks in a particular order, this order is exemplary and the operations corresponding to the blocks can be performed in different orders, and can be combined and/or divided into blocks and/or operations having different functionality than shown in FIG. 6. Furthermore, the exemplary method and/or procedure shown in FIG. 6 can be complementary to other exemplary methods and/or procedures disclosed herein, such that they are capable of being used cooperatively to provide the benefits, advantages, and/ or solutions to problems described hereinabove. Optional blocks and/or operations are indicated by dashed lines.

The exemplary method and/or procedure can include the operations of block 610, where the network node can establish a connection with a user equipment (UE) in a cell served by the network node. In various embodiments, the connection can include a signalling connection (e.g., RRC). In some embodiments, the connection can also include a data (e.g., user-plane) connection (e.g., data radio bearers (DRBs).

The exemplary method and/or procedure can include the operations of block 620, where the network node can determine that the UE is engaged in unauthorized aerial operation. In some embodiments, the operations of block 620 can include the operations of sub-block 622, where the network node can detect that the UE is engaged in aerial operation. In some embodiments, this can be done by determining information related to the altitude and movement of the UE based on one or more measurements reported by the UE or made by the RAN (sub-block 622*a*). In some embodiments, this can be done by receiving, from the UE, an indication that the UE is engaged in aerial operation (sub-block 622*b*).

The operations of block 620 can also include determining that the UE's aerial operation is unauthorized in some manner. This can be done in various ways. In some embodiments, the operations of block 620 can included the operations of sub-block 624, where the network node can determine that the UE does not have a subscription that permits aerial operation. In some embodiments, this operation can include sending, to a core network (CN), a request for subscription information relating to the UE (sub-block 624*a*) and receiving the subscription information from the CN (sub-block 624*b*). The network node can then review the received subscription information for any relevant aerial-operation information.

In other embodiments, the network node can determine that the UE's aerial operation is unauthorized based on the operations of sub-block 626, where the network node can detect that the UE is operating at an altitude higher than permitted according to the UE's subscription. In other embodiments, the network node can determine that the UE's aerial operation is unauthorized based on the operations of sub-block 628, where the network node can detect that the UE is operating in a restricted area that is not permitted according to the UE's subscription. For example, the detections performed in sub-blocks 626 and/or 628 can be based on measurements reported by the UE or made by the RAN.

The exemplary method and/or procedure can also include the operations of block 630, where the network node can perform at least one operation based on determining the unauthorized aerial operation.

In some embodiments, the at least one operation of block 630 includes the operations of sub-block 632, in which the network node can restrict the performance of the connection. In some embodiments, restricting the performance of the connection can include refraining from allocating any cell resources for one or more data radio bearers (DRBs) associated with the connection (sub-block 632a). In some embodiments, restricting the performance of the connection can include reducing transmission rates for one or more DRBs associated with the connection (sub-block 632b). In some embodiments, restricting the performance of the connection can include reducing the priority of the UE, for access to cell resources, to less than the respective priorities of other UEs in the cell (sub-block 632c).

In some embodiments, the at least one operation of block 630 includes the operations of sub-block 636, where the network node can send the UE a message comprising an indication that the connection will be released, and one or more conditions that the UE must meet before attempting to reestablish the connection. In some embodiments, the one or more conditions can include any of the following: a minimum time duration that the UE must wait; a maximum altitude that the UE must descend below; and an area that the UE must enter or exit from.

In some embodiments, the at least one operation of block 630 includes the operations of sub-block 634, where the network node can perform one or more operations with the CN. In some embodiments, these operations can include sending the CN an indication of the UE's unauthorized aerial operation (sub-block 634a) and receiving from the CN a command to release a context associated with the UE (sub-block 634d). For example, the network node can send the indication that the connection will be released (sub-block 636) based on receiving the command to release the context (sub-block 634d).

In some embodiments, the operations of sub-block 634 can also include forwarding a detach request message from the CN to the UE (sub-block 634b), and forwarding a detach accept message from the UE to the CN (sub-block 634c). For example, the network node can receive the context release command (sub-block 634d) in response to forwarding the detach accept message (sub-block 634c). In various embodiments, the detach request message can include any of the following information: a time duration until the UE will be detached from the CN; a detach cause indicating that the UE will be detached due to unauthorized aerial operation of the UE; an indication that the UE should not re-attach to the CN; an indication that the UE should re-attach to the CN via a different RAN having reduced capabilities compared to the RAN; and an indication that the UE is required to perform a tracking area update (TAU).

Figure 7:
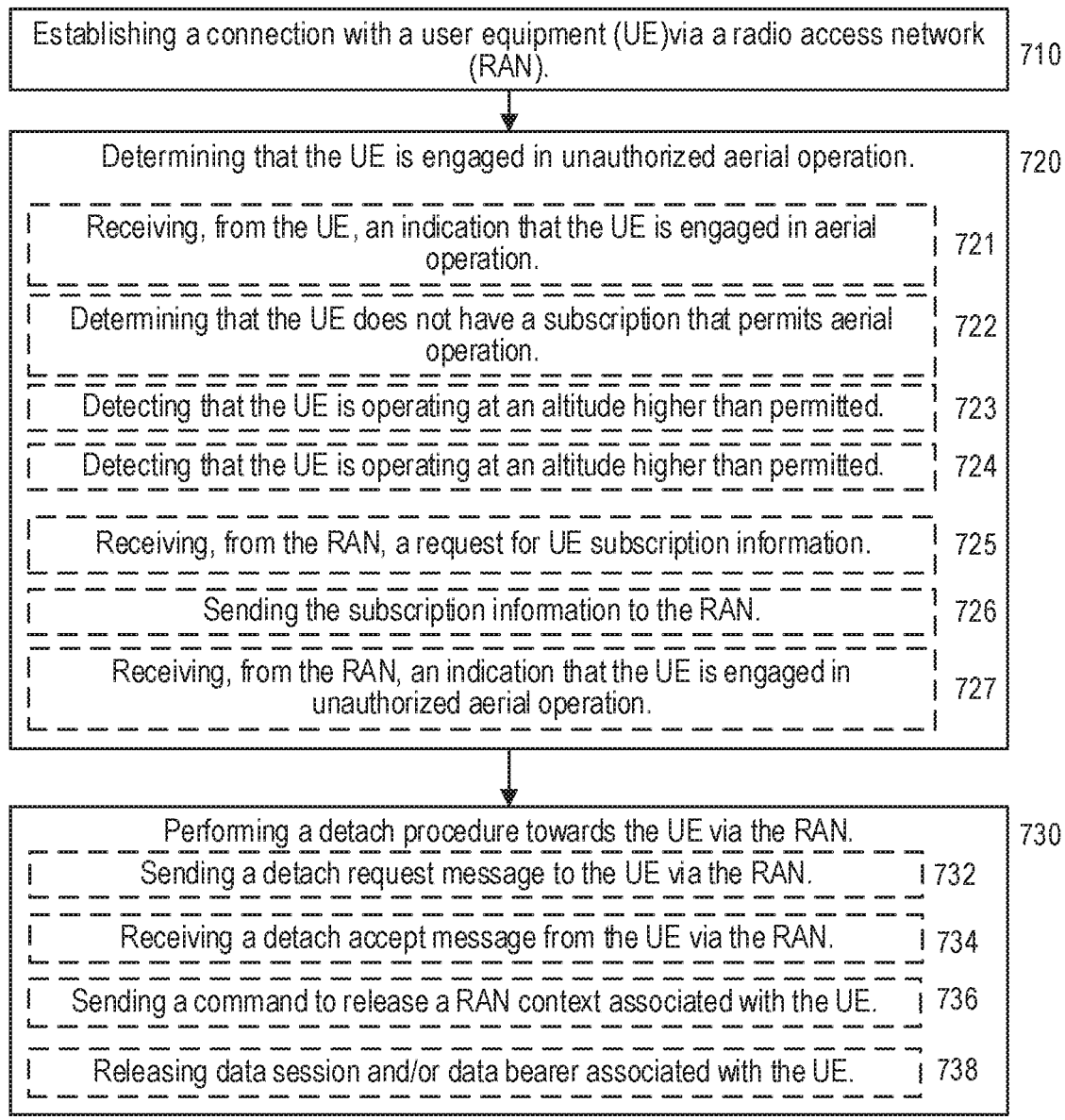
FIG. 7 illustrates exemplary methods and/or procedures performed by a one or more nodes of a core network (CN) that is connected to a radio access network (RAN), according to various exemplary embodiments of the present disclosure.

FIG. 7 illustrates an exemplary method and/or procedure performed by one or more nodes of a core network (CN) that is connected to a radio access network (RAN), according to various exemplary embodiments of the present disclosure. The exemplary method and/or procedure shown in FIG. 7 can be performed by various CN node(s) (e.g., MME, SGSN, HSS) and/or function(s) (e.g., AMF, SMF, AUSF, UDM), such as described herein with reference to other figures. Although the exemplary method and/or procedure is illustrated in FIG. 7 by blocks in a particular order, this order is exemplary and the operations corresponding to the blocks can be performed in different orders, and can be combined and/or divided into blocks having different functionality than shown in FIG. 7. Furthermore, the exemplary method and/or procedure shown in FIG. 7 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

The exemplary method and/or procedure can include the operations of block 710, where the CN can establishing a connection with a user equipment (UE) via the RAN. In various embodiments, the connection can include a signalling (e.g., control-plane) connection. In some embodiments, the connection can also include a data (e.g., user-plane) connection, which can include one or more data bearers and/or be associated with a data session between the UE and the CN.

The exemplary method and/or procedure can include the operations of block 720, where the CN determine that the UE is engaged in unauthorized aerial operation. In some embodiments, the operations of block 720 can include the operations of sub-block 721, where the CN can receive, from the RAN, an indication that the UE is engaged in aerial operation. In some embodiments, the operations of block 720 can included the operations of sub-block 722, where the CN can determine that the UE does not have a subscription that permits aerial operation.

In some embodiments, the operations of block 720 can include the operations of sub-block 723, where the CN can detect that the UE is operating at an altitude higher than permitted according to the UE's subscription. In other embodiments, the operations of block 720 can include the operations of sub-block 724, where the CN can detect that the UE is operating in a restricted area that is not permitted according to the UE's subscription. For example, the detections performed in sub-blocks 723 and/or 724 can be based on measurements provided by the UE or by the RAN.

In other embodiments, the operations of block 720 can include the operations of sub-block 725, where the CN can receive, from the RAN, a request for subscription information relating to the UE. In such embodiments, the operations of block 720 can also include the operations of sub-block 726, where the CN can send the requested subscription information to the RAN. In such embodiments, the operations of block 720 can also include the operations of sub-block 727, where the CN can receive, from the RAN, an indication that the UE is engaged in unauthorized aerial operation.

The exemplary method and/or procedure can include the operations of block 730, where the CN can, based on determining that the UE is engaged in unauthorized aerial operation, perform a detach procedure towards the UE via the RAN. This can involve various operations, as explained in more detail below.

In some embodiments, the operations of block 730 can include sending a detach request message to the UE via the RAN (sub-block 731) and receiving a detach accept message from the UE via the RAN (sub-block 732). In various embodiments, the detach request message can include any of the following information: a time duration until the UE will be detached from the CN; a detach cause indicating that the UE will be detached due to unauthorized aerial operation of the UE; an indication that the UE should not re-attach to the CN; an indication that the UE should re-attach to the CN via a different RAN having reduced capabilities compared to the RAN; and an indication that the UE is required to perform a tracking area update (TAU).

In some embodiments, the operations of block 730 can also include the operations of sub-block 733, where the CN can send, to the RAN, a command to release a context associated with the UE. In some embodiments, the operations of block 730 can also include the operations of sub-block 734, where the CN can release a data session and/or a data bearer associated with the UE.

Figure 8:
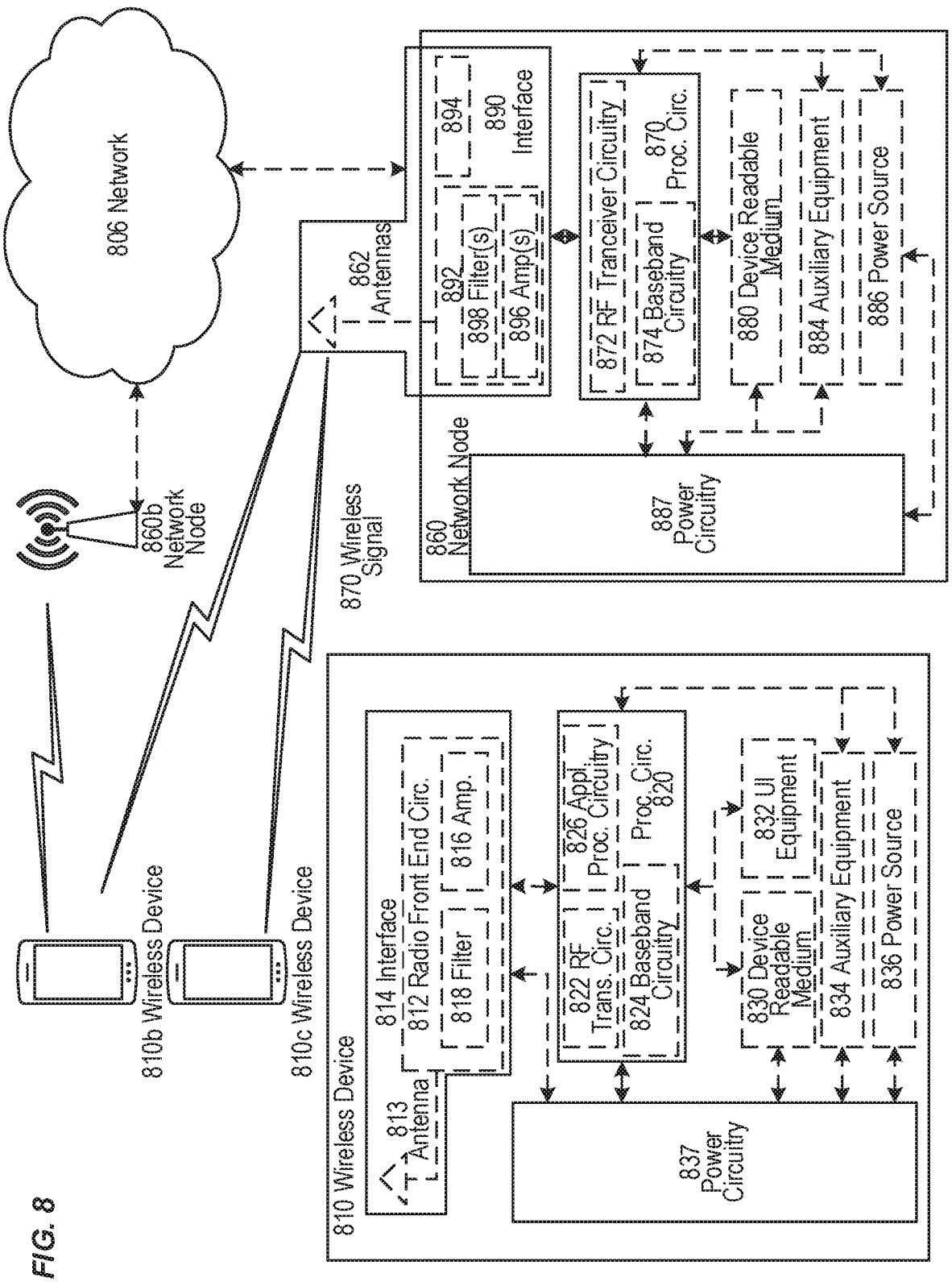
FIG. 8 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network can further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 860 are depicted as single boxes located within a larger box, or nested within multiple boxes, in practice, a network node can comprise multiple different physical components that make up a single illustrated component (e.g., device readable medium 880 can comprise multiple separate hard drives as well as multiple RAM modules).

Similarly, network node 860 can be composed of multiple physically separate components (e.g., a NodeB component and a RNC component, or a BTS component and a BSC component, etc.), which can each have their own respective components. In certain scenarios in which network node 860 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 860 can be configured to support multiple radio access technologies (RATs). In such embodiments, some components can be duplicated (e.g., separate device readable medium 880 for the different RATs)

and some components can be reused (e.g., the same antenna 862 can be shared by the RATs). Network node 860 can also include multiple sets of the various illustrated components for different wireless technologies integrated into network node 860, such as, for example, GSM, WCDMA, LTE, NR, WiFi, or Bluetooth wireless technologies. These wireless technologies can be integrated into the same or different chip or set of chips and other components within network node 860.

Processing circuitry 870 can be configured to perform any determining, calculating, or similar operations (e.g., certain obtaining operations) described herein as being provided by a network node. These operations performed by processing circuitry 870 can include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 can execute instructions stored in device readable medium 880 or in memory within processing circuitry 870. Such functionality can include providing any of the various wireless features, functions, or benefits discussed herein. In some embodiments, processing circuitry 870 can include a system on a chip (SOC).

In some embodiments, processing circuitry 870 can include one or more of radio frequency (RF) transceiver circuitry 872 and baseband processing circuitry 874. In some embodiments, radio frequency (RF) transceiver circuitry 872 and baseband processing circuitry 874 can be on separate chips (or sets of chips), boards, or units, such as radio units and digital units. In alternative embodiments, part or all of RF transceiver circuitry 872 and baseband processing circuitry 874 can be on the same chip or set of chips, boards, or units In certain embodiments, some or all of the functionality described herein as being provided by a network node, base station, eNB or other such network device can be performed by processing circuitry 870 executing instructions stored on device readable medium 880 or memory within processing circuitry 870. In alternative embodiments, some or all of the functionality can be provided by processing circuitry 870 without executing instructions stored on a separate or discrete device readable medium, such as in a hard-wired manner In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 870. Device readable medium 880 can store any suitable instructions, data or information, including a computer program, software, an application including one or more of logic, rules, code, tables, etc. and/or other instructions capable of being executed by processing circuitry 870 and, utilized by network node 860. Device readable medium 880 can be used to store any calculations made by processing circuitry 870 and/or any data received via interface 890. In some embodiments, processing circuitry 870 and device readable medium 880 can be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that can be coupled to, or in certain embodiments a part of, antenna 862. Radio front end circuitry 892 comprises filters 898 and amplifiers 896. Radio front end circuitry 892 can be connected to antenna 862 and processing circuitry 870. Radio front end circuitry can be configured to condition signals communicated between antenna 862 and processing circuitry 870. Radio front end circuitry 892 can receive digital data that is to be sent out to other network nodes or WDs via a wireless connection. Radio front end circuitry 892 can convert the digital data into a radio signal having the appropriate channel and bandwidth parameters using a combination of filters 898 and/or amplifiers 896. The radio signal can then be transmitted via antenna 862. Similarly, when receiving data, antenna 862 can collect radio signals which are then converted into digital data by radio front end circuitry 892. The digital data can be passed to processing circuitry 870. In other embodiments, the interface can comprise different components and/or different combinations of components.

In certain alternative embodiments, network node 860 may not include separate radio front end circuitry 892, instead, processing circuitry 870 can comprise radio front end circuitry and can be connected to antenna 862 without separate radio front end circuitry 892. Similarly, in some embodiments, all or some of RF transceiver circuitry 872 can be considered a part of interface 890. In still other embodiments, interface 890 can include one or more ports or terminals 894, radio front end circuitry 892, and RF transceiver circuitry 872, as part of a radio unit (not shown), and interface 890 can communicate with baseband processing circuitry 874, which is part of a digital unit (not shown).

Antenna 862 can include one or more antennas, or antenna arrays, configured to send and/or receive wireless signals. Antenna 862 can be coupled to radio front end circuitry 890 and can be any type of antenna capable of transmitting and receiving data and/or signals wirelessly. In some embodiments, antenna 862 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 862 can be separate from network node 860 and can be connectable to network node 860 through an interface or port.

Antenna 862, interface 890, and/or processing circuitry 870 can be configured to perform any receiving operations and/or certain obtaining operations described herein as being performed by a network node. Any information, data and/or signals can be received from a wireless device, another network node and/or any other network equipment. Similarly, antenna 862, interface 890, and/or processing circuitry 870 can be configured to perform any transmitting operations described herein as being performed by a network node. Any information, data and/or signals can be transmitted to a wireless device, another network node and/or any other network equipment.

Power circuitry 887 can comprise, or be coupled to, power management circuitry and can be configured to supply the components of network node 860 with power for performing the functionality described herein. Power circuitry 887 can receive power from power source 886. Power source 886 and/or power circuitry 887 can be configured to provide power to the various components of network node 860 in a form suitable for the respective components (e.g., at a voltage and current level needed for each respective component). Power source 886 can either be included in, or external to, power circuitry 887 and/or network node 860. For example, network node 860 can be connectable to an external power source (e.g., an electricity outlet) via an input circuitry or interface such as an electrical cable, whereby the external power source supplies power to power circuitry 887. As a further example, power source 886 can comprise a source of power in the form of a battery or battery pack which is connected to, or integrated in, power circuitry 887. The battery can provide backup power should the external power source fail. Other types of power sources, such as photovoltaic devices, can also be used.

Alternative embodiments of network node 860 can include additional components beyond those shown in FIG. 8 that can be responsible for providing certain aspects of the network node's functionality, including any of the functionality described herein and/or any functionality necessary to support the subject matter described herein. For example, network node 860 can include user interface equipment to allow and/or facilitate input of information into network node 860 and to allow and/or facilitate output of information from network node 860. This can allow and/or facilitate a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 can include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies can be integrated into the same or different chips or set of chips as other components within WD 810.

Antenna 811 can include one or more antennas or antenna arrays, configured to send and/or receive wireless signals, and is connected to interface 814. In certain alternative embodiments, antenna 811 can be separate from WD 810 and be connectable to WD 810 through an interface or port. Antenna 811, interface 814, and/or processing circuitry 820 can be configured to perform any receiving or transmitting operations described herein as being performed by a WD. Any information, data and/or signals can be received from a network node and/or another WD. In some embodiments, radio front end circuitry and/or antenna 811 can be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and can be configured to condition signals communicated between antenna 811 and processing circuitry 820. Radio front end circuitry 812 can be coupled to or a part of antenna 811. In some embodiments, WD 810 may not include separate radio front end circuitry 812; rather, processing circuitry 820 can comprise radio front end circuitry and can be connected to antenna 811. Similarly, in some embodiments, some or all of RF transceiver circuitry 822 can be considered a part of interface 814. Radio front end circuitry 812 can receive digital data that is to be sent out to other network nodes or WDs via a wireless connection. Radio front end circuitry 812 can convert the digital data into a radio signal having the appropriate channel and bandwidth parameters using a combination of filters 818 and/or amplifiers 816. The radio signal can then be transmitted via antenna 811. Similarly, when receiving data, antenna 811 can collect radio signals which are then converted into digital data by radio front end circuitry 812. The digital data can be passed to processing circuitry 820. In other embodiments, the interface can comprise different components and/or different combinations of components.

Processing circuitry 820 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality can include providing any of the various wireless features or benefits discussed herein. For example, processing circuitry 820 can execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry can comprise different components and/or different combinations of components. In certain embodiments processing circuitry 820 of WD 810 can comprise a SOC. In some embodiments, RF transceiver circuitry 822, baseband processing circuitry 824, and application processing circuitry 826 can be on separate chips or sets of chips. In alternative embodiments, part or all of baseband processing circuitry 824 and application processing circuitry 826 can be combined into one chip or set of chips, and RF transceiver circuitry 822 can be on a separate chip or set of chips. In still alternative embodiments, part or all of RF transceiver circuitry 822 and baseband processing circuitry 824 can be on the same chip or set of chips, and application processing circuitry 826 can be on a separate chip or set of chips. In yet other alternative embodiments, part or all of RF transceiver circuitry 822, baseband processing circuitry 824, and application processing circuitry 826 can be combined in the same chip or set of chips. In some embodiments, RF transceiver circuitry 822 can be a part of interface 814. RF transceiver circuitry 822 can condition RF signals for processing circuitry 820.

In certain embodiments, some or all of the functionality described herein as being performed by a WD can be provided by processing circuitry 820 executing instructions stored on device readable medium 830, which in certain embodiments can be a computer-readable storage medium. In alternative embodiments, some or all of the functionality can be provided by processing circuitry 820 without executing instructions stored on a separate or discrete device readable storage medium, such as in a hard-wired manner In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 can be configured to perform any determining, calculating, or similar operations (e.g., certain obtaining operations) described herein as being performed by a WD. These operations, as performed by processing circuitry 820, can include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 can be operable to store a computer program, software, an application including one or more of logic, rules, code, tables, etc. and/or other instructions capable of being executed by processing circuitry 820. Device readable medium 830 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 820. In some embodiments, processing circuitry 820 and device readable medium 830 can be considered to be integrated.

User interface equipment 832 can include components that allow and/or facilitate a human user to interact with WD 810. Such interaction can be of many forms, such as visual, audial, tactile, etc. User interface equipment 832 can be operable to produce output to the user and to allow and/or facilitate the user to provide input to WD 810. The type of interaction can vary depending on the type of user interface equipment 832 installed in WD 810. For example, if WD 810 is a smart phone, the interaction can be via a touch screen; if WD 810 is a smart meter, the interaction can be through a screen that provides usage (e.g., the number of gallons used) or a speaker that provides an audible alert (e.g., if smoke is detected). User interface equipment 832 can include input interfaces, devices and circuits, and output interfaces, devices and circuits. User interface equipment 832 can be configured to allow and/or facilitate input of information into WD 810, and is connected to processing circuitry 820 to allow and/or facilitate processing circuitry 820 to process the input information. User interface equipment 832 can include, for example, a microphone, a proximity or other sensor, keys/buttons, a touch display, one or more cameras, a USB port, or other input circuitry. User interface equipment 832 is also configured to allow and/or facilitate output of information from WD 810, and to allow and/or facilitate processing circuitry 820 to output information from WD 810. User interface equipment 832 can include, for example, a speaker, a display, vibrating circuitry, a USB port, a headphone interface, or other output circuitry. Using one or more input and output interfaces, devices, and circuits, of user interface equipment 832, WD 810 can communicate with end users and/or the wireless network, and allow and/or facilitate them to benefit from the functionality described herein.

Auxiliary equipment 834 is operable to provide more specific functionality which may not be generally performed by WDs. This can comprise specialized sensors for doing measurements for various purposes, interfaces for additional types of communication such as wired communications etc. The inclusion and type of components of auxiliary equipment 834 can vary depending on the embodiment and/or scenario.

Power source 836 can, in some embodiments, be in the form of a battery or battery pack. Other types of power sources, such as an external power source (e.g., an electricity outlet), photovoltaic devices or power cells, can also be used. WD 810 can further comprise power circuitry 837 for delivering power from power source 836 to the various parts of WD 810 which need power from power source 836 to carry out any functionality described or indicated herein. Power circuitry 837 can in certain embodiments comprise power management circuitry. Power circuitry 837 can additionally or alternatively be operable to receive power from an external power source; in which case WD 810 can be connectable to the external power source (such as an electricity outlet) via input circuitry or an interface such as an electrical power cable. Power circuitry 837 can also in certain embodiments be operable to deliver power from an external power source to power source 836. This can be, for example, for the charging of power source 836. Power circuitry 837 can perform any converting or other modification to the power from power source 836 to make it suitable for supply to the respective components of WD 810.

Figure 9:
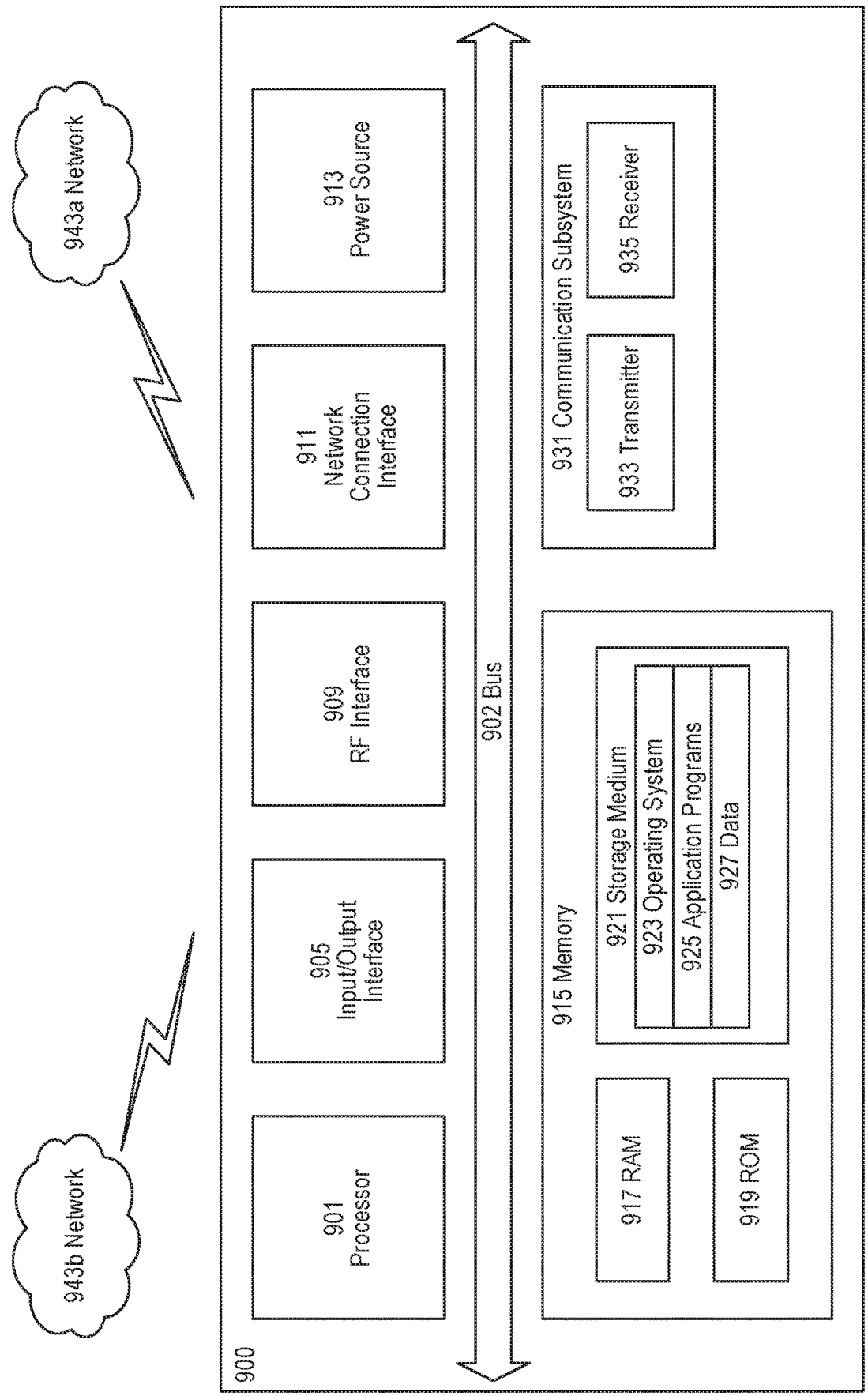
FIG. 9 illustrates an exemplary embodiment of a UE, in accordance with various aspects described herein.

FIG. 9 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 9200 can be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 can include other similar types of information. Certain UEs can utilize all of the components shown in FIG. 9, or only a subset of the components. The level of integration between the components can vary from one UE to another UE. Further, certain UEs can contain multiple instances of a component, such as multiple processors, memories, transceivers, transmitters, receivers, etc.

In FIG. 9, processing circuitry 901 can be configured to process computer instructions and data. Processing circuitry 901 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 can include two central processing units (CPUs). Data can be information in a form suitable for use by a computer.

In the depicted embodiment, input/output interface 905 can be configured to provide a communication interface to an input device, output device, or input and output device. UE 900 can be configured to use an output device via input/output interface 905. An output device can use the same type of interface port as an input device. For example, a USB port can be used to provide input to and output from UE 900. The output device can be a speaker, a sound card, a video card, a display, a monitor, a printer, an actuator, an emitter, a smartcard, another output device, or any combination thereof. UE 900 can be configured to use an input device via input/output interface 905 to allow and/or facilitate a user to capture information into UE 900. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 9, RF interface 909 can be configured to provide a communication interface to RF components such as a transmitter, a receiver, and an antenna. Network connection interface 911 can be configured to provide a communication interface to network 943a. Network 943a can encompass wired and/or wireless networks such as a local-area network (LAN), a wide-area network (WAN), a computer network, a wireless network, a telecommunications network, another like network or any combination thereof. For example, network 943a can comprise a Wi-Fi network. Network connection interface 911 can be configured to include a receiver and a transmitter interface used to communicate with one or more other devices over a communication network according to one or more communication protocols, such as Ethernet, TCP/IP, SONET, ATM, or the like. Network connection interface 911 can implement receiver and transmitter functionality appropriate to the communication network links (e.g., optical, electrical, and the like). The transmitter and receiver functions can share circuit components, software or firmware, or alternatively can be implemented separately.

RAM 917 can be configured to interface via bus 902 to processing circuitry 901 to provide storage or caching of data or computer instructions during the execution of software programs such as the operating system, application programs, and device drivers. ROM 919 can be configured to provide computer instructions or data to processing circuitry 901. For example, ROM 919 can be configured to store invariant low-level system code or data for basic system functions such as basic input and output (I/O), startup, or reception of keystrokes from a keyboard that are stored in a non-volatile memory. Storage medium 921 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 can be configured to include operating system 923, application program 925 such as a web browser application, a widget or gadget engine or another application, and data file 927. Storage medium 921 can store, for use by UE 900, any of a variety of various operating systems or combinations of operating systems.

Storage medium 921 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 can allow and/or facilitate UE 900 to access computer-executable instructions, application programs or the like, stored on transitory or non-transitory memory media, to off-load data, or to upload data. An article of manufacture, such as one utilizing a communication system can be tangibly embodied in storage medium 921, which can comprise a device readable medium.

In FIG. 9, processing circuitry 901 can be configured to communicate with network 943*b* using communication subsystem 931. Network 943*a* and network 943*b* can be the same network or networks or different network or networks. Communication subsystem 931 can be configured to include one or more transceivers used to communicate with network 943*b*. For example, communication subsystem 931 can be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver can include transmitter 933 and/or receiver 935 to implement transmitter or receiver functionality, respectively, appropriate to the RAN links (e.g., frequency allocations and the like). Further, transmitter 933 and receiver 935 of each transceiver can share circuit components, software or firmware, or alternatively can be implemented separately.

In the illustrated embodiment, the communication functions of communication subsystem 931 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 can include cellular communication, Wi-Fi communication, Bluetooth communication, and GPS communication. Network 943*b* can encompass wired and/or wireless networks such as a local-area network (LAN), a wide-area network (WAN), a computer network, a wireless network, a telecommunications network, another like network or any combination thereof. For example, network 943*b* can be a cellular network, a Wi-Fi network, and/or a near-field network. Power source 913 can be configured to provide alternating current (AC) or direct current (DC) power to components of UE 900.

The features, benefits and/or functions described herein can be implemented in one of the components of UE 900 or partitioned across multiple components of UE 900. Further, the features, benefits, and/or functions described herein can be implemented in any combination of hardware, software or firmware. In one example, communication subsystem 931 can be configured to include any of the components described herein. Further, processing circuitry 901 can be configured to communicate with any of such components over bus 902. In another example, any of such components can be represented by program instructions stored in memory that when executed by processing circuitry 901 perform the corresponding functions described herein. In another example, the functionality of any of such components can be partitioned between processing circuitry 901 and communication subsystem 931. In another example, the non-computationally intensive functions of any of such components can be implemented in software or firmware and the computationally intensive functions can be implemented in hardware.

Figure 10:
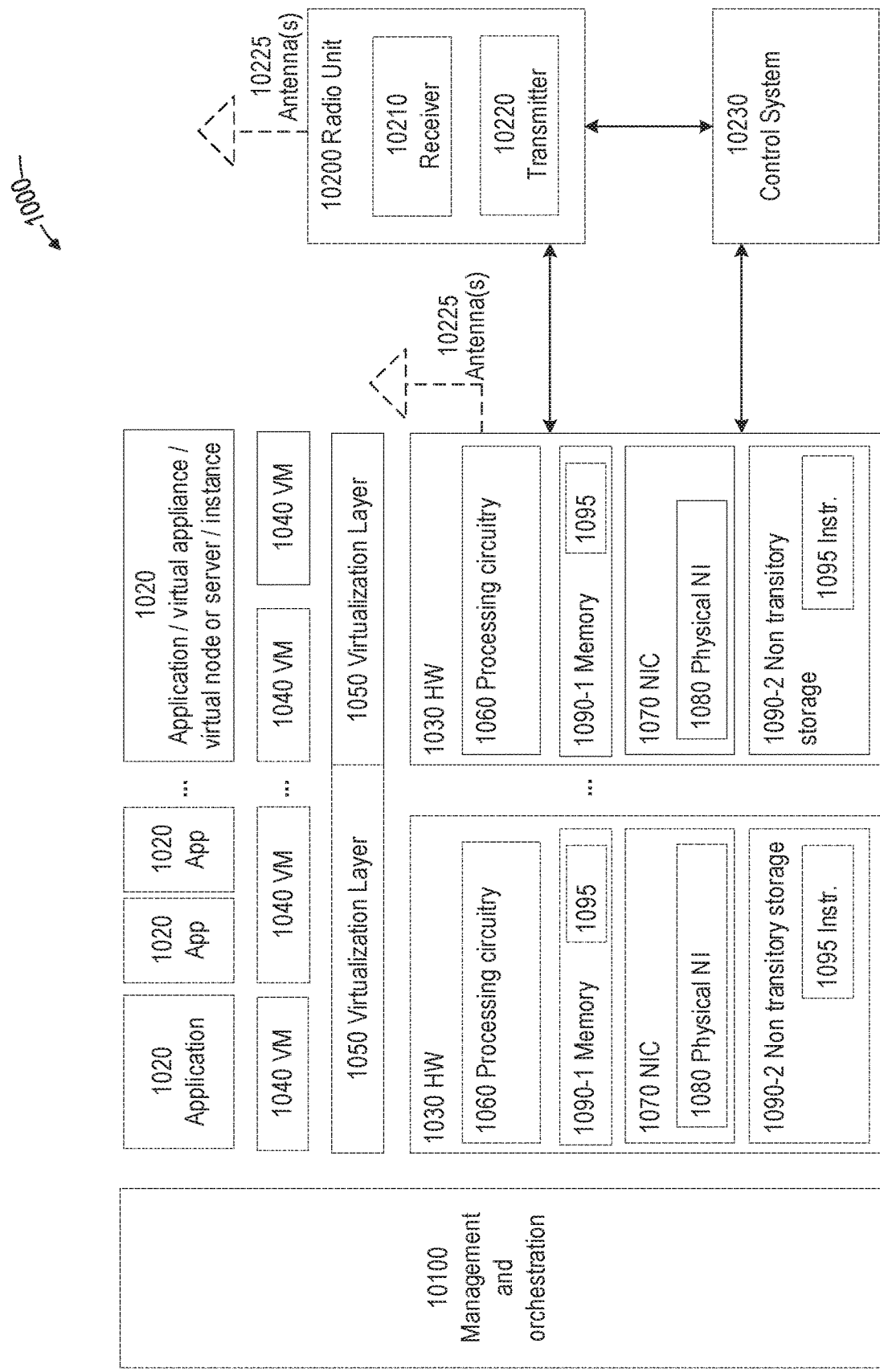
FIG. 10 is a block diagram illustrating an exemplary virtualization environment usable for implementation of various embodiments of network nodes described herein.

FIG. 10 is a schematic block diagram illustrating a virtualization environment 1000 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node can be entirely virtualized.

The functions can be implemented by one or more applications 1020 (which can alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which can be commercial off-the-shelf (COTS) processors, dedicated Application Specific Integrated Circuits (ASICs), or any other type of processing circuitry including digital or analog hardware components or special purpose processors. Each hardware device can comprise memory 1090-1 which can be non-persistent memory for temporarily storing instructions 1095 or software executed by processing circuitry 1060. Each hardware device can comprise one or more network interface controllers (NICs) 1070, also known as network interface cards, which include physical network interface 1080. Each hardware device can also include non-transitory, persistent, machine-readable storage media 1090-2 having stored therein software 1095 and/or instructions executable by processing circuitry 1060. Software 1095 can include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and can be run by a corresponding virtualization layer 1050 or hypervisor. Different embodiments of the instance of virtual appliance 1020 can be implemented on one or more of virtual machines 1040, and the implementations can be made in different ways.

During operation, processing circuitry 1060 executes software 1095 to instantiate the hypervisor or virtualization layer 1050, which can sometimes be referred to as a virtual machine monitor (VMM). Virtualization layer 1050 can present a virtual operating platform that appears like networking hardware to virtual machine 1040.

As shown in FIG. 10, hardware 1030 can be a standalone network node with generic or specific components. Hardware 1030 can comprise antenna 10225 and can implement some functions via virtualization. Alternatively, hardware 1030 can be part of a larger cluster of hardware (e.g., such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1040 can be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 can be coupled to one or more antennas 10225. Radio units 10200 can communicate directly with hardware nodes 1030 via one or more appropriate network interfaces and can be used in combination with the virtual components to provide a virtual node with radio capabilities, such as a radio access node or a base station.

In some embodiments, some signalling can be effected with the use of control system 10230 which can alternatively be used for communication between the hardware nodes 1030 and radio units 10200.

Figure 11:
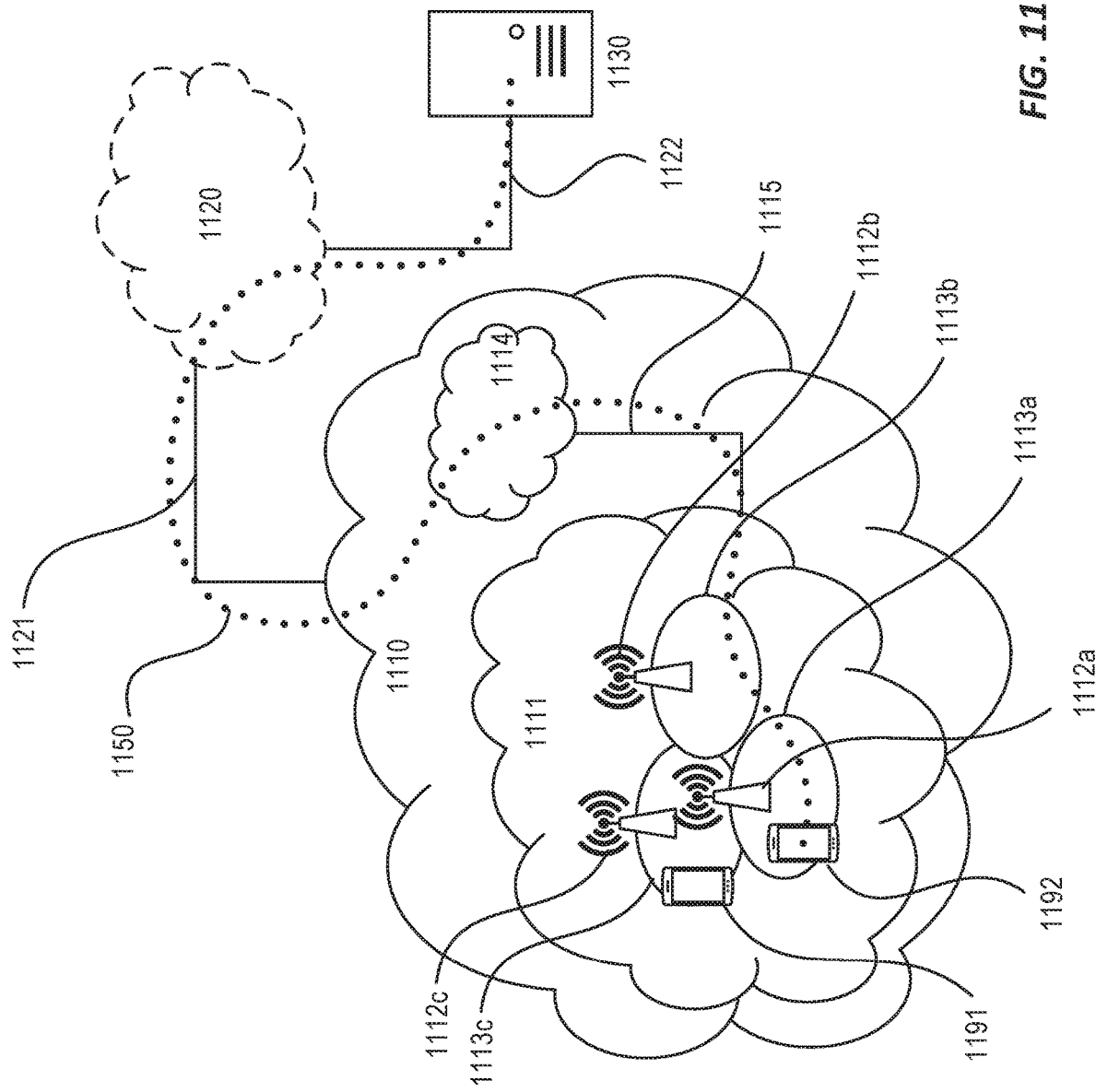
FIGS. 11-12 are block diagrams of various exemplary communication systems and/or networks, in accordance with various aspects described herein.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NB s, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c can be configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the Telecommunication network 1110 is itself connected to host computer 1130, which can be embodied in the hardware and/or software of a standalone server, a cloud-implemented server, a distributed server or as processing resources in a server farm. Host computer 1130 can be under the ownership or control of a service provider, or can be operated by the service provider or on behalf of the service provider. Connections 1121 and 1122 between telecommunication network 1110 and host computer 1130 can extend directly from core network 1114 to host computer 1130 or can go via an optional intermediate network 1120. Intermediate network 1120 can be one of, or a combination of more than one of, a public, private or hosted network; intermediate network 1120, if any, can be a backbone network or the Internet; in particular, intermediate network 1120 can comprise two or more sub-networks (not shown).

The communication system of FIG. 11 as a whole enables connectivity between the connected UEs 1191, 1192 and host computer 1130. The connectivity can be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 can be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which can have storage and/or processing capabilities. In particular, processing circuitry 1218 can comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 can be operable to provide a service to a remote user, such as UE 1230 connecting via OTT connection 1250 terminating at UE 1230 and host computer 1210. In providing the service to the remote user, host application 1212 can provide user data which is transmitted using OTT connection 1250.

Communication system 1200 can also include base station 1220 provided in a telecommunication system and comprising hardware 1225 enabling it to communicate with host computer 1210 and with UE 1230. Hardware 1225 can include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 can be configured to facilitate connection 1260 to host computer 1210. Connection 1260 can be direct or it can pass through a core network (not shown in FIG. 12) of the telecommunication system and/or through one or more intermediate networks outside the telecommunication system. In the embodiment shown, hardware 1225 of base station 1220 can also include processing circuitry 1228, which can comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 can also include UE 1230 already referred to. Its hardware 1235 can include radio interface 1237 configured to set up and maintain wireless connection 1270 with a base station serving a coverage area in which UE 1230 is currently located. Hardware 1235 of UE 1230 can also include processing circuitry 1238, which can comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 can be operable to provide a service to a human or non-human user via UE 1230, with the support of host computer 1210. In host computer 1210, an executing host application 1212 can communicate with the executing client application 1232 via OTT connection 1250 terminating at UE 1230 and host computer 1210. In providing the service to the user, client application 1232 can receive request data from host application 1212 and provide user data in response to the request data. OTT connection 1250 can transfer both the request data and the user data. Client application 1232 can interact with the user to generate the user data that it provides.

Figure 12:
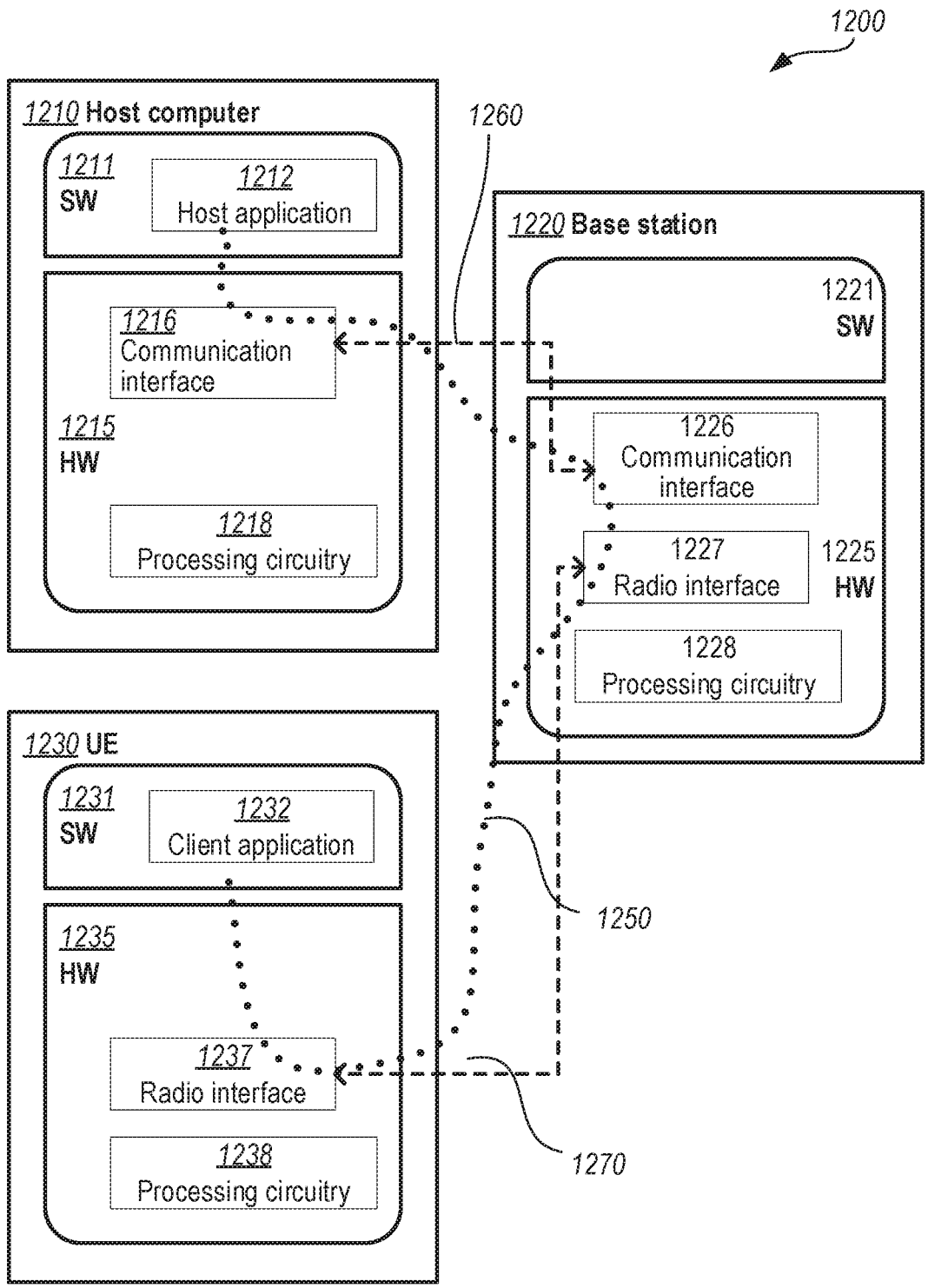

It is noted that host computer 1210, base station 1220 and UE 1230 illustrated in FIG. 12 can be similar or identical to host computer 1130, one of base stations 1112a, 1112b, 1112c and one of UEs 1191, 1192 of FIG. 11, respectively. This is to say, the inner workings of these entities can be as shown in FIG. 12 and independently, the surrounding network topology can be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure can determine the routing, which it can be configured to hide from UE 1230 or from the service provider operating host computer 1210, or both. While OTT connection 1250 is active, the network infrastructure can further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1250 between host computer 1210 and UE 1230, in response to variations in the measurement results. The measurement procedure and/or the network functionality for reconfiguring OTT connection 1250 can be implemented in software 1211 and hardware 1215 of host computer 1210 or in software 1231 and hardware 1235 of UE 1230, or both. In embodiments, sensors (not shown) can be deployed in or in association with communication devices through which OTT connection 1250 passes; the sensors can participate in the measurement procedure by supplying values of the monitored quantities exemplified above, or supplying values of other physical quantities from which software 1211, 1231 can compute or estimate the monitored quantities. The reconfiguring of OTT connection 1250 can include message format, retransmission settings, preferred routing etc.; the reconfiguring need not affect base station 1220, and it can be unknown or imperceptible to base station 1220. Such procedures and functionalities can be known and practiced in the art. In certain embodiments, measurements can involve proprietary UE signaling facilitating host computer 1210's measurements of throughput, propagation times, latency and the like. The measurements can be implemented in that software 1211 and 1231 causes messages to be transmitted, in particular empty or 'dummy' messages, using OTT connection 1250 while it monitors propagation times, errors etc.

FIG. 13 is a flowchart illustrating an exemplary method and/or procedure implemented in a communication system, in accordance with one embodiment. The communication system includes a host computer, a base station and a UE which, in some exemplary embodiments, can be those described with reference to FIGS. 11 and 12. For simplicity of the present disclosure, only drawing references to FIG. 13 will be included in this section. In step 1310, the host computer provides user data. In substep 1311 (which can be optional) of step 1310, the host computer provides the user data by executing a host application. In step 1320, the host computer initiates a transmission carrying the user data to the UE. In step 1330 (which can be optional), the base station transmits to the UE the user data which was carried in the transmission that the host computer initiated, in accordance with the teachings of the embodiments described throughout this disclosure. In step 1340 (which can also be optional), the UE executes a client application associated with the host application executed by the host computer.

FIG. 14 is a flowchart illustrating an exemplary method and/or procedure implemented in a communication system, in accordance with one embodiment. The communication system includes a host computer, a base station and a UE which can be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission can pass via the base station, in accordance with the teachings of the embodiments described throughout this disclosure. In step 1430 (which can be optional), the UE receives the user data carried in the transmission.

FIG. 15 is a flowchart illustrating an exemplary method and/or procedure implemented in a communication system, in accordance with one embodiment. The communication system includes a host computer, a base station and a UE which can be those described with reference to FIGS. 11 and 12. For simplicity of the present disclosure, only drawing references to FIG. 15 will be included in this section. In step 1510 (which can be optional), the UE receives input data provided by the host computer. Additionally or alternatively, in step 1520, the UE provides user data. In substep 1521 (which can be optional) of step 1520, the UE provides the user data by executing a client application. In substep 1511 (which can be optional) of step 1510, the UE executes a client application which provides the user data in reaction to the received input data provided by the host computer. In providing the user data, the executed client application can further consider user input received from the user. Regardless of the specific manner in which the user data was provided, the UE initiates, in substep 1530 (which can be optional), transmission of the user data to the host computer. In step 1540 of the method, the host computer receives the user data transmitted from the UE, in accordance with the teachings of the embodiments described throughout this disclosure.

FIG. 16 is a flowchart illustrating an exemplary method and/or procedure implemented in a communication system, in accordance with one embodiment. The communication system includes a host computer, a base station and a UE which can be those described with reference to FIGS. 11 and 12. For simplicity of the present disclosure, only drawing references to FIG. 16 will be included in this section. In step 1610 (which can be optional), in accordance with the teachings of the embodiments described throughout this disclosure, the base station receives user data from the UE. In step 1620 (which can be optional), the base station initiates transmission of the received user data to the host computer. In step 1630 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method performed by a network node of a radio access network (RAN), the method comprising:
   establishing a connection with a user equipment (UE) in a cell served by the network node;
   determining that the UE is engaged in unauthorized aerial operation; and
   based on determining the unauthorized aerial operation, performing the following operations:
   restricting the performance of the connection by:
      refraining from allocating any cell resources for one or more data radio bearers (DRBs) associated with the connection; and
      reducing transmission rates for the one or more DRBs associated with the connection; and
   sending to the UE a message comprising:
      an indication that the connection will be released; and
      one or more conditions that the UE must meet before attempting to reestablish the connection.

2. The method of claim 1, wherein determining that the UE is engaged in the unauthorized aerial operation comprises:
   detecting that the UE is engaged in aerial operation; and
   at least one of the following operations:
      determining that the UE does not have a subscription that permits the aerial operation;
      detecting that the UE is operating at an altitude higher than permitted according to the UE's subscription; and
      detecting that the UE is operating in a restricted area that is not permitted according to the UE's subscription.

3. The method of claim 2, wherein detecting that the UE is engaged in the aerial operation comprises at least one of the following:
   determining information related to the altitude and movement of the UE based on one or more measurements reported by the UE or made by the RAN; and
   receiving, from the UE, an indication that the UE is engaged in the aerial operation.

4. The method of claim 2, wherein determining that the UE does not have a subscription that permits the aerial operation comprises:
   after detecting that the UE is engaged in the aerial operation, sending, to a core network (CN), a request for subscription information relating to the UE; and
   receiving the subscription information from the CN.

5. The method of claim 4, wherein:
   the request to the CN also includes an indication that the UE is engaged in the aerial operation; and
   the subscription information relating to the UE comprises an indication that the UE does not have a subscription that permits the aerial operation.

6. The method of 1, wherein the one or more conditions included in the message sent to the UE comprises any of the following:
   a minimum time duration that the UE must wait;
   a maximum altitude that the UE must descend below; and
   an area that the UE must enter or exit from.

7. The method of claim 1, further comprising performing the following operations based on determining the unauthorized aerial operation:
   sending, to a core network (CN), an indication of the UE's unauthorized aerial operation; and
   receiving, from the CN, a command to release a context associated with the UE, wherein
      the indication that the connection will be released is sent in response to the command.

8. The method of claim 7, further comprising performing the following operations based on determining the unauthorized aerial operation:
   forwarding a detach request message from the CN to the UE; and
   forwarding a detach accept message from the UE to the CN, wherein the command to release the context is received in response to the detach accept message.

9. The method of claim 8, wherein the detach request message comprises at least one of the following:
   a time duration until the UE will be detached from the CN;
   a detach cause indicating that the UE will be detached due to the unauthorized aerial operation of the UE;
   an indication that the UE should not re-attach to the CN;
   an indication that the UE should re-attach to the CN via a different RAN having reduced capabilities compared to the RAN; and
   an indication that the UE is required to perform a tracking area update (TAU).

10. The method of claim 1, wherein the message sent to the UE also includes at least one of the following:
    a time duration until the connection will be released;
    a release cause indicating that the connection will be released due to the unauthorized aerial operation of the UE; and
    an indication that the UE is required to perform a tracking area update (TAU).

11. The method of claim 1, wherein restricting the performance of the connection further comprises:
    reducing the priority of the UE, for access to cell resources, to less than the respective priorities of other UEs in the cell.

12. A method performed by a one or more nodes of a core network (CN) that is connected to a radio access network (RAN), the method comprising:
    establishing a connection with a user equipment, (UE) via the RAN;
    determining that the UE is engaged in unauthorized aerial operation; and
    based on determining that the UE is engaged in the unauthorized aerial operation, performing a detach procedure towards the UE via the RAN,
       wherein performing the detach procedure comprises sending a detach request message to the UE via the RAN, and
       wherein the detach request message comprises:
          an indication that the UE should re-attach to the CN via a different RAN having reduced capabilities compared to the RAN, and
          an indication that the UE is required to perform a tracking area update (TAU).

13. The method of claim 12, wherein determining that the UE is engaged in the unauthorized aerial operation comprises at least one of the following operations:
    determining that the UE does not have a subscription that permits aerial operation;
    detecting that the UE is operating at an altitude higher than permitted according to the UE's subscription; and
    detecting that the UE is operating in a restricted area that is not permitted according to the UE's subscription.

14. The method of claim 13, wherein determining that the UE is engaged in the unauthorized aerial operation further comprises receiving, from the RAN, an indication that the UE is engaged in the aerial operation.

15. The method of claim 12, wherein determining that the UE is engaged in the unauthorized aerial operation comprises:
    receiving, from the RAN, a request for subscription information relating to the UE;
    sending the requested subscription information to the RAN; and
    receiving, from the RAN, an indication that the UE is engaged in the unauthorized aerial operation.

16. The method of claim 12, wherein performing the detach procedure further comprises:
    receiving a detach accept message from the UE via the RAN;
    sending, to the RAN, a command to release a context associated with the UE; and
    releasing at least one of the following associated with the UE: a data session and a data bearer.

17. The method of claim 16, wherein the detach request message further comprises at least one of the following:
- a detach cause indicating that the UE will be detached due to the unauthorized aerial operation of the UE; and
- an indication that the UE should not re-attach to the CN.

18. A network node of a radio access network (RAN), the network node comprising:
- interface circuitry configured to communicate with one or more user equipment (UEs) and with a core network (CN);
- processing circuitry operably coupled to the interface circuitry, whereby the processing circuitry and the interface circuitry are configured to perform operations corresponding to the method of claim 1.

19. A non-transitory, computer-readable medium storing computer-executable instructions that, when executed by processing circuitry of a network node of a radio access network (RAN), configure the network node to perform operations corresponding to the method of claim 1.

20. A network node of a core network (CN), the network node comprising:
- interface circuitry configured to communicate with one or more network nodes of a radio access network (RAN);
- processing circuitry operably coupled to the interface circuitry, whereby the processing circuitry and the interface circuitry are configured to perform operations corresponding to the method of claim 12.

21. A non-transitory, computer-readable medium storing computer-executable instructions that, when executed by processing circuitry of a network node of a core network (CN), configure the network node to perform operations corresponding to the method of claim 12.

* * * * *